(12) United States Patent
Tsukagoshi

(10) Patent No.: US 10,506,264 B2
(45) Date of Patent: Dec. 10, 2019

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/122,698

(22) PCT Filed: Apr. 9, 2015

(86) PCT No.: PCT/JP2015/061069
§ 371 (c)(1),
(2) Date: Aug. 31, 2016

(87) PCT Pub. No.: WO2015/159786
PCT Pub. Date: Oct. 22, 2015

(65) Prior Publication Data
US 2017/0127092 A1 May 4, 2017

(30) Foreign Application Priority Data

Apr. 14, 2014 (JP) .................................. 2014-083232

(51) Int. Cl.
*H04N 21/236* (2011.01)
*H04N 21/2662* (2011.01)
*H04N 21/434* (2011.01)

(52) U.S. Cl.
CPC ....... *H04N 21/236* (2013.01); *H04N 21/2662* (2013.01); *H04N 21/434* (2013.01)

(58) Field of Classification Search
None
See application file for complete search history.

(56) References Cited

U.S. PATENT DOCUMENTS 6,175,577 B1 * 1/2001 Van Den Heuvel ........................
H04N 21/23608
370/537
2008/0175325 A1 * 7/2008 Hannuksela ......... H04N 21/222
375/240.26

(Continued)

FOREIGN PATENT DOCUMENTS

JP 2002-10251 A 1/2002
WO 03/075524 A1 9/2003

(Continued)

OTHER PUBLICATIONS

Extended European Search Report dated Oct. 18, 2017 in corresponding European Patent Application No. 15779798.6, 7 pages.

(Continued)

*Primary Examiner* — Jason K Lin
(74) *Attorney, Agent, or Firm* — Oblon, McClelland, Maier & Neustadt, L.L.P.

(57) ABSTRACT

An image encoding unit generates a video stream by encoding image data of each picture that constitutes moving image data. A transmission unit transmits a container in a predetermined format that continuously includes a first video stream and a second video stream generated in the image encoding unit. The first video stream and the second video stream are composed of first to Mth streams out of first to Nth streams (M≤N). The transmission unit applies a fixed identifier to the respective first to Nth streams. The image encoding unit can prevent an occurrence of a display mute in a case of switching services.

9 Claims, 21 Drawing Sheets

(56) References Cited

U.S. PATENT DOCUMENTS

| | | | |
|---|---|---|---|
| 2009/0122877 A1* | 5/2009 | Haskell | H04N 19/00048 375/240.26 |
| 2009/0187960 A1 | 7/2009 | Lee et al. | |
| 2010/0316134 A1* | 12/2010 | Chen | H04N 21/21805 375/240.25 |
| 2011/0164686 A1* | 7/2011 | Lu | H04N 21/234327 375/240.25 |
| 2011/0182354 A1* | 7/2011 | Jang | H04N 19/132 375/240.02 |
| 2012/0159336 A1* | 6/2012 | Norwood | G06F 3/0482 715/733 |
| 2013/0070859 A1* | 3/2013 | Lu | H04N 19/30 375/240.25 |
| 2014/0168366 A1 | 6/2014 | Ichiki et al. | |
| 2014/0301440 A1* | 10/2014 | Narasimhan | H04N 19/70 375/240.02 |
| 2015/0110203 A1* | 4/2015 | Wang | H04N 19/136 375/240.26 |
| 2015/0215662 A1* | 7/2015 | Shin | H04N 21/26603 725/116 |
| 2015/0229878 A1 | 8/2015 | Hwang et al. | |

FOREIGN PATENT DOCUMENTS

| | | |
|---|---|---|
| WO | WO 2013/015116 A1 | 1/2013 |
| WO | 2014/002914 A1 | 1/2014 |
| WO | WO 2014/025213 A1 | 2/2014 |
| WO | 2014/034463 A1 | 3/2014 |

OTHER PUBLICATIONS

Office Action dated Jun. 14, 2016 in Japanese Patent Application No. 2015-232809 (with English language translation).

Office Action dated Jun. 28, 2016 in Japanese Patent Application No. 2015-232815 (with English language translation).

International Search Report dated Jun. 30, 2015 in PCT/JP2015/061069 filed Apr. 9, 2015.

Gary J. Sullivan, et al., "Overview of the High Efficiency Video Coding (HEVC) Standard", IEEE Transactions on Circuits and Systems for Video Technology, vol. 22, No. 12, Dec. 2012, pp. 1649-1668.

Shuichi Aoki, et al., "A Study on MMT for Hybrid Delivery on Broadcast and Broadband", IPSJ SIC Technical Report, vol. 2014-AVM-84, No. 2, Feb. 21, 2014, 19 pages (with English Abstract and English Translation).

"Series H: Audiovisual and Multimedia Systems, Infrastructure of audiovisual services—Coding of moving video, High efficiency video coding", ITU-T, H.265, International Telecommunication Union, Apr. 2013, 2 pages.

"Text of ISO/IEC 13818-1:201X/FDAM 3: Information Technology—Generic coding of moving pictures and associated audio information: Systems, Amendment 3: Transport of HEVC video over MPEG-2 systems", ISO/IEC JTC 1/SC 29/WG 11, Sep. 6, 2013, 3 pages.

Office Action dated Jan. 30, 2018 in Japanese Patent Application No. 2015-153166, 10 pages (with English language translation).

Shuichi Aoki, et al., "A Study on MMT for Hybrid Delivery on Broadcast and Broadband", IPSJ SIC Technical Report, vol. 2014-AVM-84, No. 2, 2014, 6 pages.

Satoyuki Yamamoto, "HEVC Profile: Level and Enhancement Work", Journal of the Institute of Image Information and Television Engineers, vol. 67, No. 7, 2013, 8 pages.

Japanese Office Action issued in Japanese Patent Application No. 2015-153166 dated Jul. 24, 2018 , (w/ English Translation).

Aoki et al., "A Study on MMT for Hybrid Delivery on Broadcast and Broadband," IPSJ SIG Technical Report, vol. 2014-AVM-84, No. 2, Information Processing Society of Japan (Feb. 21, 2014).

Combined Chinese Office Action and Search Report dated Jan. 2, 2019 in Patent Application No. 201580017541.8 (with English translation).

Communication pursuant to Article 94(3) EPC dated May 28, 2019, in corresponding European Patent Application No. 15 779 798.6.

* cited by examiner

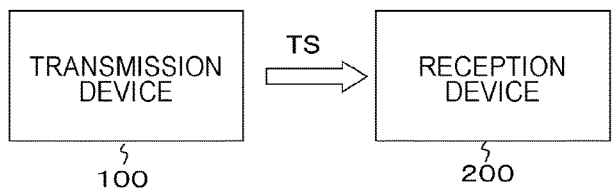

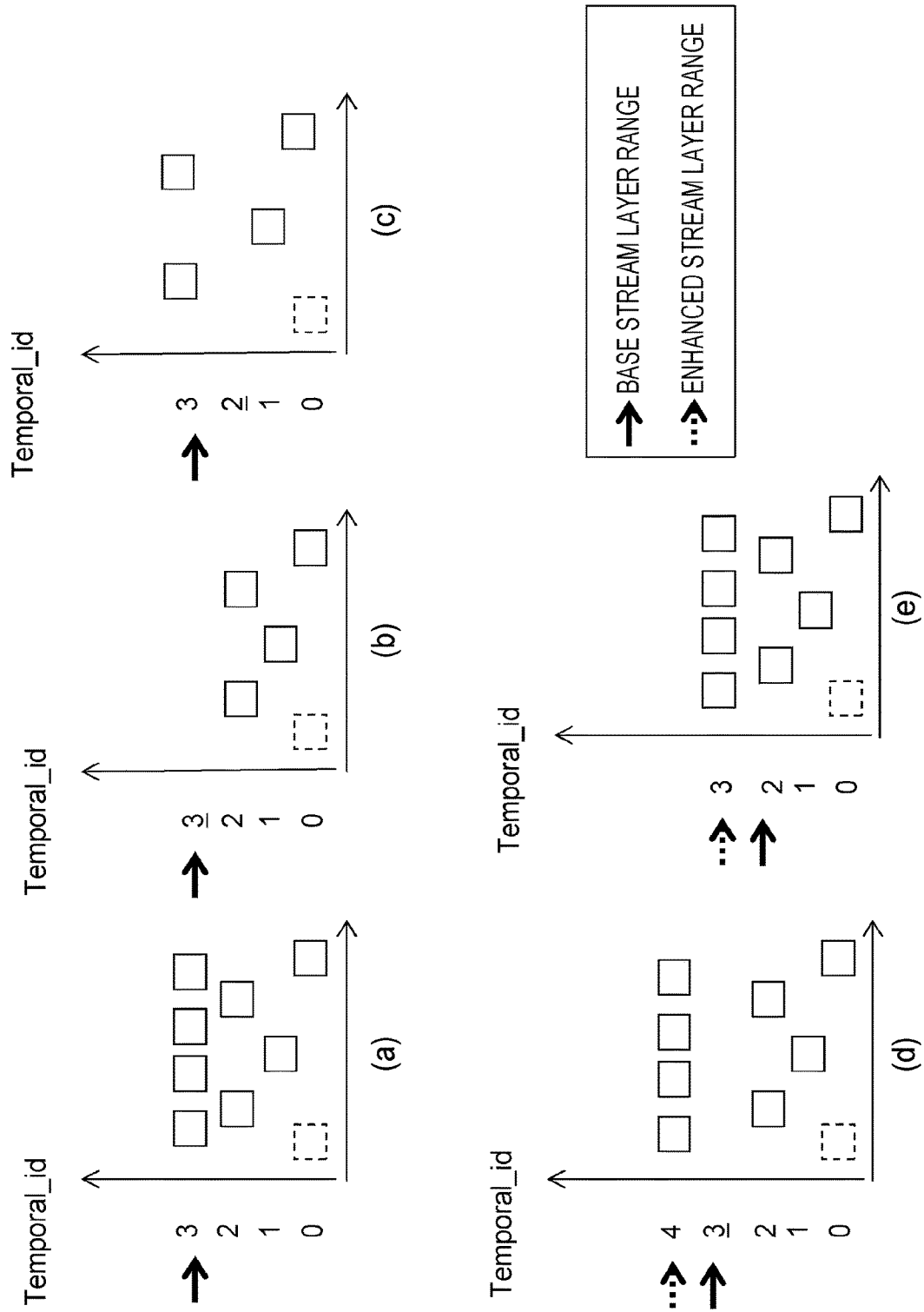

```
nal_unit_header( ) {                    Descriptor
    forbidden_zero_bit                  f(1)
    nal_unit_type                       u(6)
    nuh_layer_id                        u(6)
    nuh_temporal_id_plus1               u(3)
}
```

(b)

Semantics

Forbidden_zero_bit    (1bit)
　　0 IS REQUIRED.
Nal_unit_type    (6bits)
　　THE VALUE IS DETERMINED FOR EACH OF THE FOLLOWING NAL units.

| AUD | VPS | SPS | PPS | PSEI | SLICE | SSEI | EOS |

Nuh_layer_id    (6bits)
　　0 IS ASSUMED.
Nuh_temporal_id_plus1    (3bits)
　　TAKE A VALUE (1 TO 7) WHICH IS CALCULATED
　　BY ADDING 1 TO temporal_id.
　　THE VALUE OF temporal_id ITSELF BECOMES 0 TO 6.

FIG. 6

| HEVC_descriptor() { | | |
|---|---|---|
| descriptor_tag | 8 | uimsbf |
| descriptor_length | 8 | uimsbf |
| profile_space | 2 | uimsbf |
| tier_flag | 1 | bslbf |
| profile_idc | 5 | uimsbf |
| reserved_zero_16bits | 16 | bslbf |
| level_idc | 8 | uimsbf |
| profile_compatibility_indication | 32 | bslbf |
| temporal_layer_subset_flag | 1 | bslbf |
| HEVC_still_present_flag | 1 | bslbf |
| HEVC_24hr_picture_present_flag | 1 | bslbf |
| frame_packing_arrangement_SEI_present_flag | 1 | bslbf |
| reserved | 4 | bslbf |
| if ( temporal_layer_subset_flag == '1') { | | |
| temporal_id_min | 3 | uimsbf |
| reserved | 5 | bslbf |
| temporal_id_max | 3 | uimsbf |
| reserved | 5 | bslbf |
| } | | |
| } | | |

FIG. 7

Seamless switch descriptor Syntax

| Syntax | No. of Bits | Format |
|---|---|---|
| Seamless_switch descriptor ( ) { | | |
| descriptor_tag | 8 | bslbf |
| descriptor_length | 8 | bslbf |
| EOS_flag | 1 | bslbf |
| number_of_streams | 3 | uimsbf |
| frame_rate | 4 | uimsbf |
| spatial_resolution | 4 | uimsbf |
| scanning_format | 1 | bslbf |
| reserved | 3 | 0x7 |
| } | | |

FIG. 8

Seamless switch descriptor Semantics

EOS_flag (1bit)
    FLAG INDICATING THAT end_of_seq IS ENCODED AT THE END OF THE STREAM.
        1        ENCODED.
        0        NOT ENCODED.

number_of_streams (3bits)
    INDICATE THE NUMBER OF SERVICE STREAMS AFTER SWITCHING.

frame_rate (4bits)
    INDICATE FRAME FREQUENCY OF SERVICE STREAM AFTER SWITCHING.

| | |
|---|---|
| 0000 | reserved |
| 0001 | 24 Hz |
| 0010 | 24/1.001 Hz |
| 0011 | 25 Hz |
| 0100 | 30 Hz |
| 0101 | 30/1.001 Hz |
| 0110 | 48 Hz |
| 0111 | 48/1.001 Hz |
| 1000 | 50 Hz |
| 1001 | 60 Hz |
| 1010 | 60/1.001 Hz |
| 1011 | 100 Hz |
| 1100 | 120 Hz |
| 1101 | 120/1..001 Hz | spatial_resolution (4bits)
    INDICATE SURFACE IMAGERY OF SERVICE STREAM AFTER SWITCHING.

| | |
|---|---|
| 0000 | reserved |
| 0001 | 720 (h) x 480 (v) |
| 0010 | 1280 (h) x 720 (v) |
| 0011 | 1920 (h) x 1080 (v) |
| 0100 | 3840 (h) x 2160 (v) |
| 0101 | 7680 (h) x 4320 (v) | scanning_format (1bit)
    INDICATE FRAME STRUCTURE.
        1        PROGRESSIVE
        0        INTERLACED

*FIG. 9*

Video_decode control descriptor Syntax

| Syntax | No. of Bits | Format |
|---|---|---|
| Video_decode_control_descriptor ( ) { | | |
| descriptor_tag | 8 | uimsbf |
| descriptor_length | 8 | uimsbf |
| still_picture_flag | 1 | bslbf |
| sequence_end_code_flag | 1 | bslbf |
| video_encode_format | 4 | bslbf |
| frame_rate_type | 1 | bslbf |
| stream_not_extended_flag | 1 | bslbf |
| } | | |

FIG. 10

Semantics sequence_end_code_flag (1bit) FLAG INDICATING THAT end_of_seq IS ENCODED AT THE END OF THE STREAM.
    1    ENCODED.
    0    NOT ENCODED.

video_encode_format (4bits) INDICATE FORMAT OF SERVICE STREAM AFTER SWITCHING.
    0000    1080p    (2K)
    0001    1080i    (2K)
    0010    720p
    0011    480p
    0100    480i
    0101    240p
    0110    120p
    0111    2160p    (4K)
    1000    4320p    (8K)
    1001 - 1111    FOR ENHANCING frame_rate_type (1bit) INDICATE TYPE OF FRAME RATE AFTER SWITCHING.
    1    CONVENTIONAL 60 Hz OR LOWER
    0    COMPOSE 120 Hz OR HIGHER stream_not_extended_flag (1bit) INDICATE THAT THERE IS NO ENHANCED STREAM AFTER SWITCHING.
    1    NO ENHANCED STREAM OF DIFFERENT PID
    0    ENHANCED STREAM OF DIFFERENT PID IS MULTIPLEXED, FORMING 120p THEREWITH

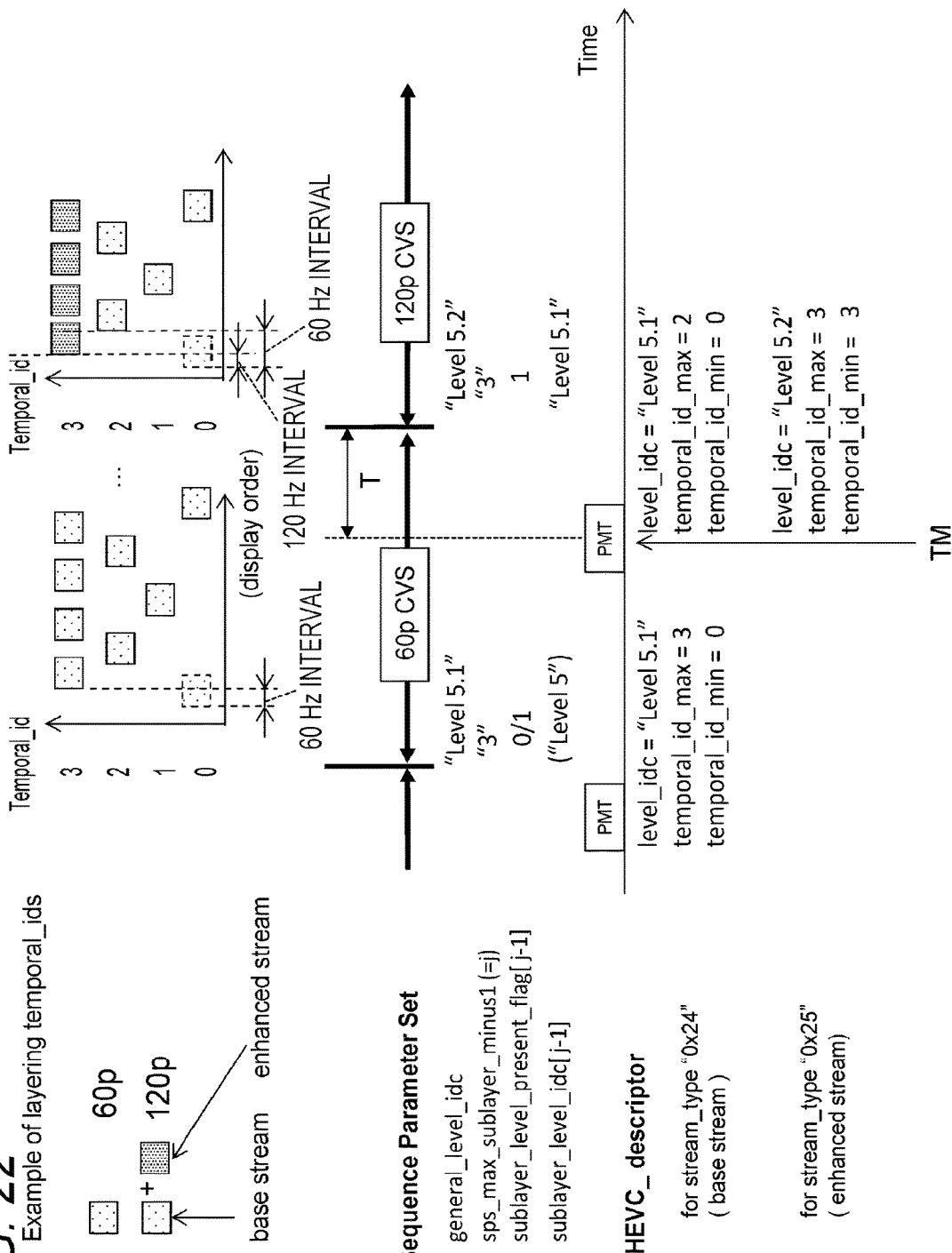

TRANSMISSION DEVICE, TRANSMISSION METHOD, RECEPTION DEVICE, AND RECEPTION METHOD

TECHNICAL FIELD

The present technique relates to a transmission device, a transmission method, a reception device, and a reception method, and relates to the transmission device or the like for continuously transmitting video streams of a plurality of services.

BACKGROUND ART

In broadcasting, it is assumed to transmit as mixing a plurality of services having different image formats, for example, in different frame rates. For example, sports program are provided in a 120P service, other programs are provided in a 60P service, and the like.

Conventionally, regarding HEVC (High Efficiency Video Coding), for example, it has been proposed a temporal scalability that hierarchical encoding is performed on image data of each picture which constitutes moving image data (see Non-Patent Document 1). The reception side can identify a hierarchy of each picture based on temporal ID (temporal_id) information which is inserted in a header of a NAL (Network Abstraction Layer) unit, and selective decoding can be performed for the hierarchies which correspond to its decode performance.

CITATION LIST

Non-Patent Document

Non-Patent Document 1: Gary J. Sullivan, Jens-Rainer Ohm, Woo-Jin Han, Thomas Wiegand, "Overview of the High Efficiency Video Coding (HEVC) Standard" IEEE TRANSACTIONS ON CIRCUITS AND SYSTEMS FOR VIDEO TECNOROGY, VOL. 22, NO. 12, pp. 1649-1668, DECEMBER 2012

SUMMARY OF THE INVENTION

Problems to be Solved by the Invention

An object of the present technique is to easily prevent an occurrence of a display mute when a service is switched.

Solutions to Problems

A concept of the present technique lies in
a transmission device including:
an image encoding unit configured to encode image data of each picture that constitutes moving image data and generate a video stream; and
a transmission unit configured to transmit a container in a predetermined format that continuously includes a first video stream and a second video stream which are generated by the image encoding unit, wherein
the first video stream and the second video stream are composed of first to Mth streams out of first to Nth streams (M≤N), and
the transmission unit applies a fixed identifier to the first to Nth streams respectively.

According to the present technique, the image encoding unit generates a video stream by encoding image data of each picture which constitutes moving image data. The transmission unit transmits a container in a predetermined format that continuously includes a first video stream and a second video stream which are generated by the image encoding unit. For example, the first video stream and the second video stream may include at least a base stream out of a base stream and an enhanced stream.

The first video stream and the second video stream are composed of first to Mth streams out of first to Nth streams (M≤N). Then, the transmission unit applies a fixed identifier to the respective first to Nth streams.

In this manner, according to the present technique, a fixed identifier is applied to each stream. Then, in the reception side, even when the service is switched, it is not needed to change setting of the filter to extract each stream and, thus, an occurrence of a display mute can be prevented and a seamless display can be realized.

Here, in the present technique, for example, the transmission unit may constantly insert, during a transmission period of the first video stream, identifier information of each stream that constitutes the first video stream into a container layer and transmit, and may insert, at a timing immediately before a transmission period of the second video stream is started, an identifier information of each stream that constitutes the second video stream into the container layer and transmit. In this case, the reception side can easily recognize the identifier of each stream that constitutes the currently receiving video stream and, further, this helps to easily recognize the identifier of each stream that constitutes the video stream to be received after switching before the switching is performed.

Further, in the present technique, for example, the transmission unit may insert, during the transmission period of each video stream, the identifier information of the respective first to Nth streams into a container layer and transmit. In this case, the reception side can always recognize the identifier information of the first to Nth streams.

Further, in the present technique, for example, the transmission unit may insert, during the transmission period of each video stream, switching information into a container layer and transmit. In this case, for example, the switching information may include frame rate information and/or stream structure information of the encoded image data included in the second video stream. In this case, the reception side can easily recognize switching information such as a frame rate of a video stream to be received after switching, before the switching is performed.

Further, in the present technique, for example, the first video stream and the second video stream may be composed of at least a base stream out of the base stream and an enhanced stream. In this case, for example, a video stream composed of the base stream may include encoded image data in a first frame rate, and a video stream composed of the base stream and the enhanced stream may include encoded image data in a second frame rate which is twice as fast as the first frame rate.

Further, in the present technique, for example, the image encoding unit may classify image data of each picture that constitutes the moving image data into a plurality of hierarchies, encode the image data of the pictures in each classified hierarchy, divide the plurality of hierarchies into M number of hierarchy groups, and generate the first to Mth streams of each of the video stream which respectively has the encoded image data of the pictures of the divided each hierarchy group, and hierarchical encoding may be performed so that the hierarchies of the pictures which are respectively included in the respective first to Mth streams become within previously allocated ranges which are independent from each other. With this hierarchical encoding, it is possible to avoid that a mismatch between a system layer and a video layer about which stream a predetermined hierarchy is included.

Further, in the present technique, for example, the transmission unit may constantly insert, during the transmission period of the first video stream, hierarchy range information of the picture of each stream that constitutes the first video stream into the container layer and transmit, and may insert, at timing immediately before a transmission period of the second video stream is started, hierarchy range information of the picture of each stream that constitutes the second video stream into the container layer and transmit. In this case, the reception side can easily recognize the hierarchy range of each stream that constitutes the currently receiving video stream, and further, can easily recognize the hierarchy range of each stream that constitutes the video stream which is to be received after switching before the switching is performed.

Further, in the present technique, for example, the first video stream and the second video stream may include at least a base stream out of the base stream and an enhanced stream, and the image encoding unit may encode so that the number of hierarchies of the pictures included in the enhanced stream becomes one. In this case, for example, during the transmission period of each of the video stream, when only the base stream is included in the video stream, the transmission unit may insert hierarchy range information of the picture of the base stream and hierarchy range information of the picture of the enhanced stream into the container layer and transmit.

Further, another concept of the present technique lies in a reception device, including:
a reception unit configured to receive a container in a predetermined format which continuously includes a first video stream and a second video stream which include encoded image data, wherein
the first video stream and second video stream are composed of first to Mth streams out of first to Nth streams (M≤N), and
a fixed identifier is applied to the first to Nth streams respectively,
the reception device, further including:
a processing unit configured to process each stream included in the first video stream and the second video stream by filtering based on the respectively applied identifiers.

According to the present technique, the reception unit receives a container in a predetermined format that continuously includes a first video stream and a second video stream which include encoded image data. Here, the first video stream and second video stream are composed of first to Mth streams out of first to Nth streams (M≤N), and a fixed identifier is applied to the respective first to Nth streams. Then, the processing unit processes each stream included in the first video stream and the second video stream by filtering based on the applied identifiers.

In this manner, according to the present technique, a fixed identifier is applied to each stream. Thus, even when the service is switched, it is not needed to change the setting of the filter to extract each stream, and thus an occurrence of a display mute can be prevented and a seamless display can be realized.

Here, in the present technique, for example, in the first to Mth streams of each of the video stream, image data of each picture that constitutes the moving image data may be classified into a plurality of hierarchies, the image data of the pictures in each of the classified hierarchies may be encoded, the plurality of hierarchies may be divided into M number of hierarchy groups, and the encoded image data of the pictures of each of the divided hierarchy groups may respectively be included, and hierarchical encoding may be performed so that the hierarchies of the pictures included in each of the first to Mth streams become within previously allocated ranges which are independent from each other. With this hierarchical encoding, a mismatch is avoided between a system layer and a video layer about in which stream a predetermined hierarchy is included.

Further, another concept of the present technique lies in a transmission device, including:
an image encoding unit configured to generate a video stream having encoded image data, and
a transmission unit configured to transmit a container in a predetermine format which continuously includes a first video stream and a second video stream generated by the image encoding unit, wherein
the first video stream and the second video stream are composed of first to Mth streams out of first to Nth streams (M≤N),
the image encoding unit classifies image data of each picture that constitutes moving image data into a plurality of hierarchies, encodes the image data of the pictures in each classified hierarchy, divides the plurality of hierarchies into M number of hierarchy groups, and generates the first to Mth streams of each of the video streams respectively including encoded image data of the pictures of each of the divided hierarchy groups, and
hierarchical encoding is performed so that the hierarchies of the pictures included in the respective first to Mth streams become within previously allocated ranges which are independent from each other.

In the present technique, the image encoding unit generates a video stream by encoding image data of each picture that constitutes moving image data. The transmission unit transmits a container in a predetermined format that continuously includes a first video stream and a second video stream which are generated by the image encoding unit. The first video stream and the second video stream are composed of first to Mth streams out of first to Nth streams (M≤N).

The image encoding unit classifies image data of each picture that constitutes the moving image data into a plurality of hierarchies, encodes the image data of the pictures in each classified hierarchies, divides the plurality of hierarchies into M number of hierarchy groups, generates the first to Mth streams of each video stream that have encoded image data of the pictures in each divided hierarchy group, and performs hierarchical encoding so that the hierarchies of the pictures included in the respective first to Mth streams become within previously allocated ranges that are independent from each other.

In this manner, according to the present technique, hierarchical encoding is performed so that the hierarchies of the pictures included in the respective first to Mth streams become within previously allocated ranges which are independent from each other. Thus, it is possible to avoid a mismatch between a system layer and a video layer about in which stream the predetermined hierarchy is included.

Here, in the present technique, for example, the transmission unit may constantly insert, during a transmission period of the first video stream, hierarchy range information of the pictures of each stream included in the first video stream into a container layer and transmit, and may insert, at a timing immediately before a transmission period of the second video stream is started, hierarchy range information of the pictures of each stream included in the second video stream into the container layer and transmit. In this case, the reception side can easily recognize the hierarchy range of each stream that constitutes the currently receiving video stream, and further, can easily recognize the hierarchy range of each stream that constitutes the video stream to be received after switching before the switching is performed.

Further, in the present technique, for example, the first video stream and the second video stream may include at least a base stream out of the base stream and an enhanced stream, and the number of the hierarchies of the pictures included in the enhanced stream may be assumed to be one. In this case, for example, during the transmission period of each video stream, when only the base stream is included in the video stream, the transmission unit may insert hierarchy range information of the pictures of the base stream and hierarchy range information of the pictures of the enhanced stream into the container layer and transmit.

Effects of the Invention

According to the present technique, an occurrence of a display mute when switching services can be easily prevented. It is noted that the effects described here is not necessarily limited and any one of the effects described in this disclosure may be achieved.

BRIEF DESCRIPTION OF DRAWINGS

FIG. 1 is a block diagram illustrating a structure example of a transmission and reception system as an embodiment.

FIGS. 2(a) to 2(f) are diagrams illustrating example cases of service switching.

FIGS. 3(a) to 3(e) are diagrams illustrating examples of hierarchical encoding.

FIGS. 4(a) and 4(b) are diagrams illustrating a structure example of a NAL unit header and a content of a main parameter in the structure example.

FIG. 6 is a diagram illustrating a structure example of an HEVC descriptor.

FIG. 7 is a diagram illustrating a structure example of a seamless switch descriptor.

FIG. 8 is a diagram illustrating a content of main information in the structure example of the seamless switch descriptor.

FIG. 9 is a diagram illustrating a structure example of a video decode control descriptor.

FIG. 10 is a diagram illustrating contents of main information in the structure example of the video decode control descriptor.

FIG. 22 is a diagram illustrating another example of the change of the hierarchical encoding structure according to the operation of service switching.

MODE FOR CARRYING OUT THE INVENTION

Figure 5:
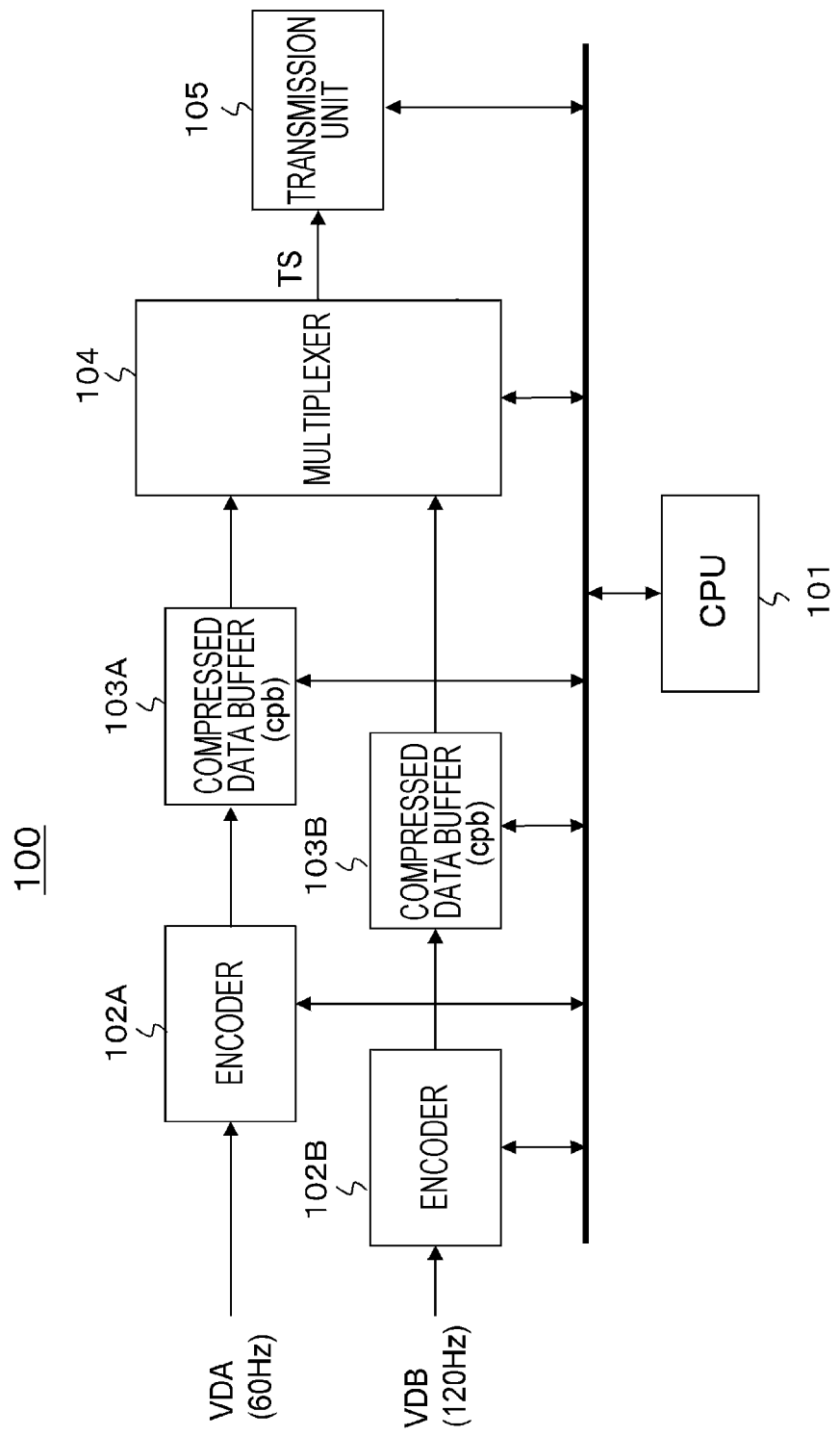
FIG. 5 is a block diagram illustrating a structure example of a transmission device.

A mode to execute the invention (hereinafter, referred to as "embodiment") will be described below. The explanation will be made in the following order:
1. Embodiment
2. Modified Embodiment 1. Embodiment

[Transmission and Reception System]

FIG. 1 illustrates a structure example of a transmission and reception system 10 as an embodiment. The transmission and reception system 10 has a configuration including a transmission device 100 and a reception device 200.

The transmission device 100 transmits a transport stream TS, which is a container format, using a broadcasting wave or a packet in a network. In the transport stream TS, video streams of different services are continuously included. In this case, each video stream is formed of first to Mth streams out of first to Nth streams (M≤N). In this case, a fixed PID (packet identifier) is respectively applied to the first to Nth streams.

Further, in the first to Mth streams that constitute each video stream, image data of respective pictures that constitute moving image data are classified into a plurality of hierarchies, the image data of the classified pictures in each hierarchy are encoded, the plurality of hierarchies are divided into M number of hierarchy groups, and the encoded image data of the pictures in each divided hierarchy group is respectively included. In this case, hierarchical encoding is performed so that the hierarchies of the pictures included in the respective first to Mth streams become within previously allocated ranges which are independent from each other.

FIGS. 2(a) to 2(f) illustrate example cases of service switching. FIG. 2(a) illustrates switching from a service in a 2160/60/p video format to a service in a 2160/120/p video format. This is switching from one stream to two streams. FIG. 2(b) illustrates switching from a service in a 1080/60/p video format to a 2160/60/p video format. This is switching from one stream to one stream.

FIG. 2(c) illustrates switching from a service in a 1080/60/p video format to a service in a 2160/120/p video format. This is switching from one stream to two streams. FIG. 2(d) illustrates switching from a service in a 2160/120/p video format to a service in a 1080/60/p video format. This is switching from two streams to one stream.

FIG. 2(e) illustrates switching from a service in a 1080/60/p video format to a service in a 1080/60/i video format. This is switching from one stream to one stream. FIG. 2(f)

illustrates switching from a three program service in a 2160/60/p video format to a service in a 4320/60/p video format. This is switching from three streams to one stream.

FIGS. 3(a) to 3(e) illustrate examples of hierarchical encoding and each rectangular shape represents a picture. FIG. 3(a) is an example that the highest hierarchy is 3 and the hierarchies 0 to 3 are all in the hierarchical range of the base stream. In this example, there are pictures in all of the hierarchies 0 to 3. FIG. 3(b) is an example that the highest hierarchy is 3 and the hierarchies 0 to 3 are all in the hierarchical range of the base stream. In this example, there is no picture in the hierarchy 3 and this causes a hierarchy gap. FIG. 3(c) is an example that the highest hierarchy is 3 and the hierarchies 0 to 3 are all in the hierarchical range of the base stream. In this example, there is no picture in the hierarchy 2 and this causes a hierarchy gap.

FIG. 3(d) is an example that the highest hierarchy is 4, the hierarchies 0 to 3 are all in the hierarchical range of the base stream, and the hierarchy 4 is in the hierarchical range of the enhanced stream. In this example, there is no picture in the hierarchy 3 and this causes a hierarchy gap. FIG. 3(e) is an example that the highest hierarchy is 3, the hierarchies 0 to 2 are in the hierarchical range of the base stream, and the hierarchy 3 is in the hierarchical range of the enhanced stream. In this example, there are pictures in all the hierarchies 0 to 3.

In hierarchical encoding, for example, encoding such as H.264/AVC and H.265/HEVC is performed so that a referenced picture is encoded to belong to its hierarchy and/or a hierarchy lower than its hierarchy. To encoded image data of the pictures in each hierarchy, hierarchy identification information (temporal_id) for identifying its hierarchy is applied, for every picture. In a header part of an NAL unit (nal_unit) of each picture, "nuh_temporal_id_plus1") that indicates hierarchy identification information (temporal_id) is provided. In this manner, when hierarchy identification information is applied, the hierarchy of each picture can be found in a reception side.

FIG. 4(a) illustrates a structure example of an NAL unit header (Syntax) and FIG. 4(b) illustrates contents (Semantics) of a main parameter in the structure example. In the 1-bit field of "Forbidden_zero_bit," 0 is mandatory. The 6-bit field of "Na1_unit_type" indicates a type of the NAL unit. In the 6-bit field of "Nuh_layer_id," 0 is assumed. The 3-bit field of "Nuh_temporal_id_plus1" indicates temporal_id and takes a value (1 to 7) to which 1 is added.

During a transmission period of video streams of each service, PID (packet identifier) information is inserted in a container layer. In this case, for example, the information is inserted with the following first or second PID information insertion manner. The PID information is inserted under a program map table (PMT) for example.

[First PID Information Insertion Manner]

In the first PID information insertion manner, during a video stream transmission period of one service, PID information of each stream that constitutes the video stream is constantly inserted and, at timing immediately before starting a video stream transmission period of a following service, PID information of each stream that constitutes the video stream is inserted.

[Second PID Information Insertion Manner]

In the second PID information insertion manner, during a video stream transmission period of each service, PID information of the respective first to Nth streams is inserted.

Further, during the video stream transmission period of each service, hierarchy range information is inserted into the container layer. The hierarchy range information is inserted under the program map table (PMT) for example. In this case, during a video stream transmission period of one service, hierarchy range information of the pictures of each stream that constitutes the video stream is constantly inserted, and at timing immediately before starting a video stream transmission period of a following service, hierarchy range information of pictures of each stream that constitutes the video stream is inserted.

Further, during the video stream transmission period of each service, switching information is inserted to the container layer. The switching information includes, for example, frame rate information, stream structure information or the like of encoded image data included in the video stream of the following service. The switching information is inserted under the program map table (PMT) for example.

The reception device 200 receives the above described transport stream TS, which is transmitted from the transmission device 100 via a broadcasting wave or a packet in a network. In the transport stream TS, video streams of a plurality of services are continuously included. Each video stream is composed of first to Mth streams out of first to Nth streams (M≤N). Here, a fixed PID (packet identifier) is respectively applied to the first to Nth streams.

The reception device 200 recognizes the PIDs of the respective streams that constitute the video streams included in the transport stream TS based on the PID (packet identifier) information inserted in the container layer. The reception device 200 processes the respective streams that constitute the video streams by filtering based on the PIDs applied thereto. The reception device 200 sequentially displays images of the video streams of each service which is continuously included in the transport stream TS.

In this case, since a fixed PID (packet identifier) is respectively applied to the first to Nth streams, even when services are switched, it is not required to change the setting of the filter to extract each stream. This prevents an occurrence of a display mute and a seamless display is performed.

Based on the hierarchy range information inserted in the container layer, the reception device 200 recognizes the hierarchy ranges of the pictures of the respective streams that constitute the video streams included in the transport stream TS. In this case, since hierarchical encoding is performed so that the hierarchies of the pictures included respectively in the first to Mth streams are within previously allocated ranges which are independent from each other, a mismatch is avoided between the a system layer and a video layer about in which stream the predetermined hierarchy is included.

Further, based on the switching information inserted in the container layer, the reception device 200 recognizes frame rate information or the like of encoded image data in a video stream of a following service before the service is switched.

According to the present embodiment, it is assumed as N=2, each video stream is composed of a base stream only or composed of a base stream and an enhanced stream. Here, in a case of a service of 60P, a video stream is composed of a base stream only and, in a case of a service of 120P, a video stream is composed of a base stream and an enhanced stream.

According to the present embodiment, encoding is performed so that the number of the hierarchies of the pictures to be included in the enhanced stream becomes one. Further, in a transmission period of a video stream which is composed of a base stream only, the following first or second manner is used. In the first manner, only the hierarchy range information of the base stream is inserted. In the second manner, in addition to inserting the hierarchy range information of the base stream, information of hierarchy ranges which may be used in the enhanced stream is inserted.

In this case, for example, a minimum value (mix) and a maximum value (max) are set as different values and it is even assumed that any enhanced streams exist in actual. In other words, according to the present embodiment, encoding is performed so that the number of hierarchies of the pictures to be included in the enhanced stream becomes one and when an enhanced stream exists, the minimum value (mix) and the maximum value (max) become the same value.

[Structure of Transmission Device]

FIG. 5 illustrates an example of a structure of the transmission device 100. The transmission device 100 includes a CPU (Central Processing Unit) 101, encoders 102A and 102B, compressed data buffers (cpb) 103A and 103B, a multiplexer 104, and a transmission unit 105. The CPU 101 is a control unit and controls operation of each unit in the transmission device 100.

The encoder 102A inputs uncompressed moving image data VDA with frame frequency of 60 Hz and for example, performs encoding such as H.264/AVC and H.265/HEVC. In this case, the encoder 102A classifies image data of each picture that constitutes the moving image data VDA into plurality of hierarchies, encodes the image data of the pictures classified into each hierarchy, and generates a video stream related to a 60P service having the encoded image data of the pictures of each hierarchy. The compressed data buffer (cpb) 103A temporarily stores the video stream.

In this video stream, only a base stream is included. In other words, the encoder 102A generates a base stream that includes encoded image data of the pictures in all hierarchies which are obtained by hierarchical encoding. Here, hierarchical encoding is performed so that the hierarchy ranges of the pictures to be included in the base stream becomes within a previously allocated range. For example, when the hierarchy ranges of the pictures included in the base stream are hierarchies 0 to 3, for example, hierarchical encoding is performed so that the highest hierarchy becomes equal to or smaller than 3, as illustrated in FIGS. 3(a) to 3(c).

The encoder 102B inputs uncompressed moving image data VDB with a frame frequency of 120 Hz and for example, performs encoding such as H.264/AVC and H.265/HEVC. In this case, the encoder 102B classifies image data of each picture that constitutes the moving image data VDB into plural hierarchies, encodes image data of the pictures classified into each hierarchy, and generates a video stream related to a 120P service having the encoded image data of the pictures of each hierarchy. The compressed data buffer (cpb) 103B temporarily stores the video stream.

In this video stream, abase stream and an enhanced stream are included. In other words, the encoder 102B divides the plural hierarchies into two and generates abase stream having encoded image data of the pictures in lower hierarchies and an enhanced stream having encoded image data of the pictures in higher hierarchies.

Here, hierarchical encoding is performed so that the hierarchy ranges of the pictures included in the base stream and the enhanced stream become within the previously allocated range, and encoding is performed so that the number of hierarchies of the pictures included in the enhanced stream becomes one. For example, when the hierarchy ranges of the pictures included in the base stream is hierarchies 0 to 3 and the hierarchy range of the pictures included in the enhanced stream is hierarchies 4 to 5, for example, as illustrated in FIG. 3(d), the hierarchies of the pictures to be included in the base stream is set as 3 or lower and the hierarchy of the pictures to be included in the enhanced stream is set as 4.

When performing a service of 60P, the multiplexer 104 reads a video stream stored in the compressed data buffer 103A and acquires a transport stream TS as a multiplexed stream by packetizing the data into a packetized elementary stream (PES) and multiplexing the data into transport packets. In this transport stream TS, only a base stream is included as described above. The multiplexer 104 applies a fixed PID (=PID_1) to this base stream.

Further, when performing a service of 120P, the multiplexer 104 reads a video stream stored in the compressed data buffer 103B and acquires a transport stream TS as multiplexed stream by packetizing the data into a packetized elementary stream (PES) and multiplexing into transport packets. In this transport stream TS, a base stream and an enhanced stream are included as described above. The multiplexer 104 applies a fixed PID (=PID_1) to the base stream and a fixed PID (=PID_2) to the enhanced stream.

The transmission unit 105 transmits the transport stream TS acquired by the multiplexer 104 to the reception device 200 via a broadcasting wave or a packet in a network. In this case, for example, a transport stream TS of a 60P service is transmitted and then a transport stream TS of a 120P service is transmitted. Alternatively, a transport stream TS of a 120P service is transmitted and then a transport stream TS of a 60P service is transmitted.

During a video stream transmission period of each service, the multiplexer 140 inserts PID information under the program map table (PMT). In this case, the multiplexer 140 inserts the PID information in the following first PID information insertion manner or second PID information insertion manner.

In other words, in the first PID information insertion manner, during a video stream transmission period of one service, PID information of each stream that constitutes the video stream is continuously inserted, and, at timing immediately before stating the following video stream transmission period, PID information of each stream that constitute the video stream is inserted. Further, in the second PID information insertion manner, during a video stream transmission period of each service, PID information of both of the base stream and the enhanced stream is inserted.

Further, during a video stream transmission period of each service, the multiplexer 104 inserts hierarchy range information under the program map table (PMT). In this case, during a video stream transmission period of one service, hierarchy range information of the picture of each stream that constitutes the video stream is continuously inserted and, at timing immediately before starting a video stream transmission period of a following service, hierarchy range information of the pictures of each stream that constitutes the video stream is inserted.

Here, during a transmission period of a video stream composed of only a base stream, the multiplexer 104 inserts hierarchy range information in the following first manner or second manner. In other words, in the first manner, only hierarchy range information of the base stream is inserted. Further, in the second manner, in addition to hierarchy range information of the base stream, information of a hierarchy range which may be taken by the enhanced stream is inserted.

As described above, it is assumed that the number of hierarchies of the pictures to be included in the enhanced stream is one, and the information of the hierarchy range which may be taken by the enhanced stream includes a plurality of hierarchies for example. With this manner, the hierarchy range that may be taken by the enhanced stream literally indicates a hierarchy range that the enhanced stream may take and it suggests that there is actually no enhanced stream.

For this insertion of the hierarchy range information, "temporal_id_min" and "temporal_id_max" fields of a conventional HEVC descriptor is used. FIG. 6 illustrates a structure example (Syntax) of an HEVC descriptor. The 8-bit field of "descriptor_tag" represents a type of the descriptor and it represents an HEVC descriptor in this example. The 8-bit field of "descriptor_length" represents the length (size) of the descriptor and represents the number of following bytes as the length of the descriptor.

The 8-bit field of "level_idc" represents a bit rate level specification value. Further, when "temporal_layer_subset_flag=1," there are a 5-bit field of "temporal_id_min" and a 5-bit field of "temporal_id_max." "temporal_id_min" represents a temporal_id value of the lowest hierarchy of hierarchical encoding data included in the corresponding video stream. "temporal_id_max" represents a temporal_id value of the highest hierarchy of hierarchical encoding data included in the corresponding video stream.

Further, during a video stream transmission period of each stream, at least at the timing immediately before the video stream transmission period of a following service is started, the multiplexer 140 inserts switching information under the program map table (PMT). For this insertion of the switching information, a newly defined seamless switch descriptor (Seamless_switch descriptor) or an existing Video decode control descriptor (Video_decode_control descriptor) is used.

FIG. 7 illustrates a structure example (syntax) of a seamless switch descriptor. Further, FIG. 8 illustrates main information contents (semantics) of the structure example. The 8-bit field of "descriptor_tag" represents a descriptor type. Here, it indicates that it is a seamless switch descriptor. The 8-bit field of "descriptor_length" represents the length (size) of the descriptor and represents the number of following bytes as the length of the descriptor.

The 1-bit field of "EOS_flag" is a flag that indicates that "end_of_seq" is being encoded at the end of the stream. "1" indicates that it has been encoded. "0" indicates that it has not been encoded. The 3-bit field of "number_of_streams" represents the number of service streams after switching. The 4-bit field of "frame_rate" represents a frame frequency of service streams after switching. For example, "1001" represents 60 Hz and "1100" represents 120 Hz.

The 4-bit field of "spatial_resolution" represents a surface imagery of service stream after switching. For example, "0001" represents 720(h)*480(v), "0010" represents 1280(h)*720(v), "0011" represents 1920(h)*1080(v), "0100" represents 3840(h)*2160(v), and "0101" represents 7680(h)*4320(v). The 1-bit field of "scanning_format" represents a frame structure. "1" represents progressive and "0" indicates to be interlaced.

FIG. 9 illustrates a structure example (Syntax) of a video decode control descriptor. Further, FIG. 10 illustrates main information contents (Semantics) of the structure example. The 8-bit field of "descriptor_tag" illustrates a descriptor type. Here, it represents a video decode control descriptor. The 8-bit field of "descriptor_length" indicates a length (size) of the descriptor and represents the number of following bytes as the length of the descriptor.

The 1-bit field of "sequence_end_code_flag" is a flag indicating that "end_of_seq" is encoded at the end of the stream. "1" represents that it is encoded. "0" represents that it is not encoded. The 4-bit field of "video_encode_format" represents a format of service stream after switching. For example, "0000" represents 1080p(2K), "0111" represents 2160p(4K), and "1000" represents 4320p(8K).

The 1-bit field of "frame_rate_type" is a field to be newly defined and represents a type of frame frequency of the stream after switching. "1" indicates to form a conventional frame rate of 60 Hz or lower and "0" indicates to form a frame rate of 120 Hz or higher. The 1-bit field of "stream_not_extended_flag" is a field to be newly defined and indicates that there is no enhanced stream in the stream after switching. "1" indicates that there is no enhanced stream with a different PID, and "0" indicates that an enhanced stream with a different PID is multiplexed and 120p is composed therewith.

Figure 11:
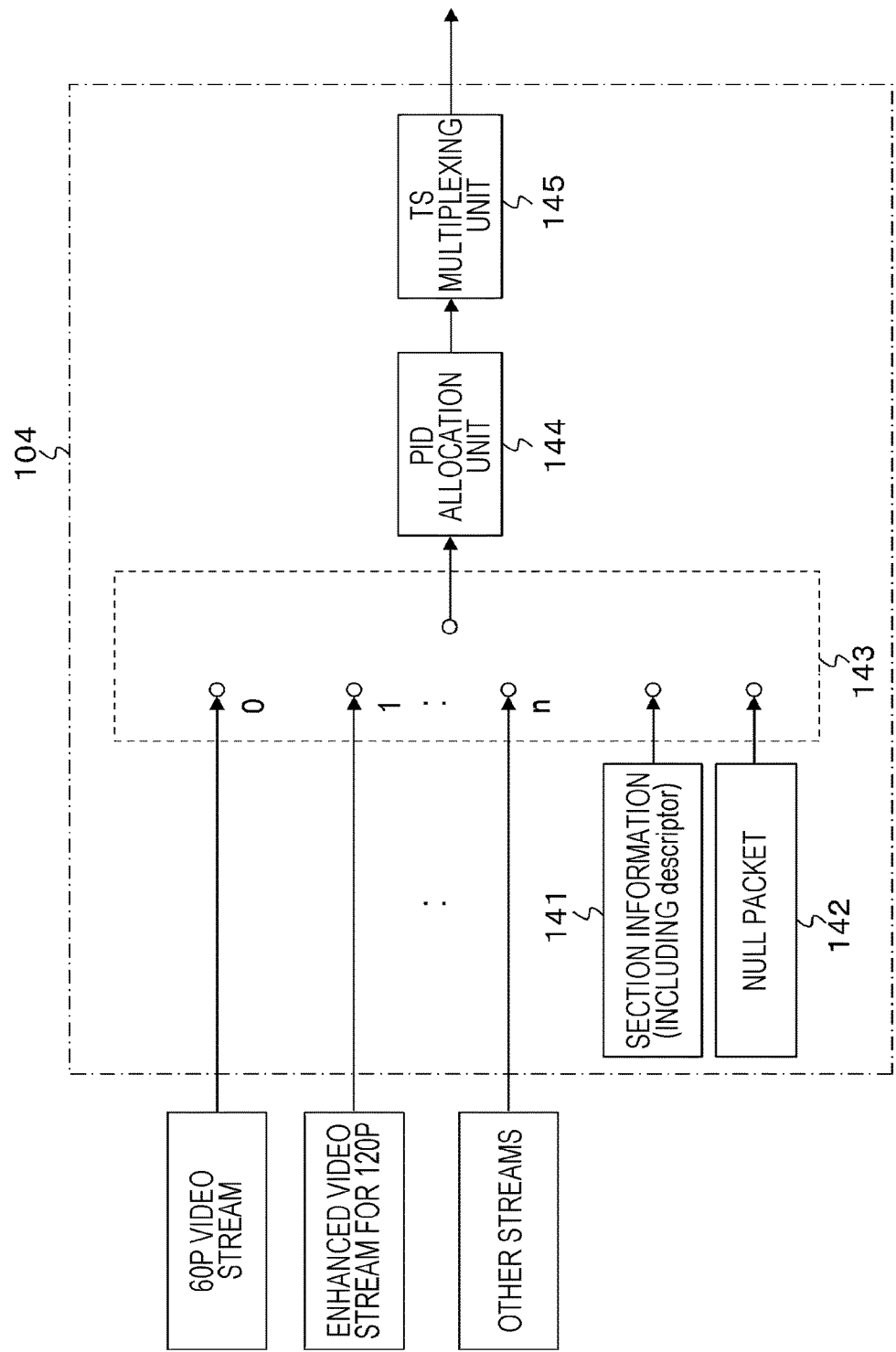
FIG. 11 is a diagram schematically illustrating a structure of a multiplexer.

FIG. 11 schematically illustrates a structure of the multiplexer 104. The multiplexer 104 includes a section information (including a descriptor) generation unit 141, a null packet generation unit 142, a selector 143, a PID allocation unit 144, and a TS multiplexing unit 145. The selector 143 inputs a video stream (a base stream) of a 60P service input from outside, a video stream (a base stream and an enhanced stream) of a 120P service, streams of other services, section information generated in the section information generation unit 141 and a null packet generated in the null packet generation unit 142, and selectively extract some data therefrom.

The PID allocation unit 144 allocates a PID to each signal which is selectively extracted in the selector 143 that is a video stream, section information, null packet and the like. The TS multiplexing unit 145 multiplexes each signal and obtains a transport stream TS.

[Structure of Transport Stream TS]

Figure 12:
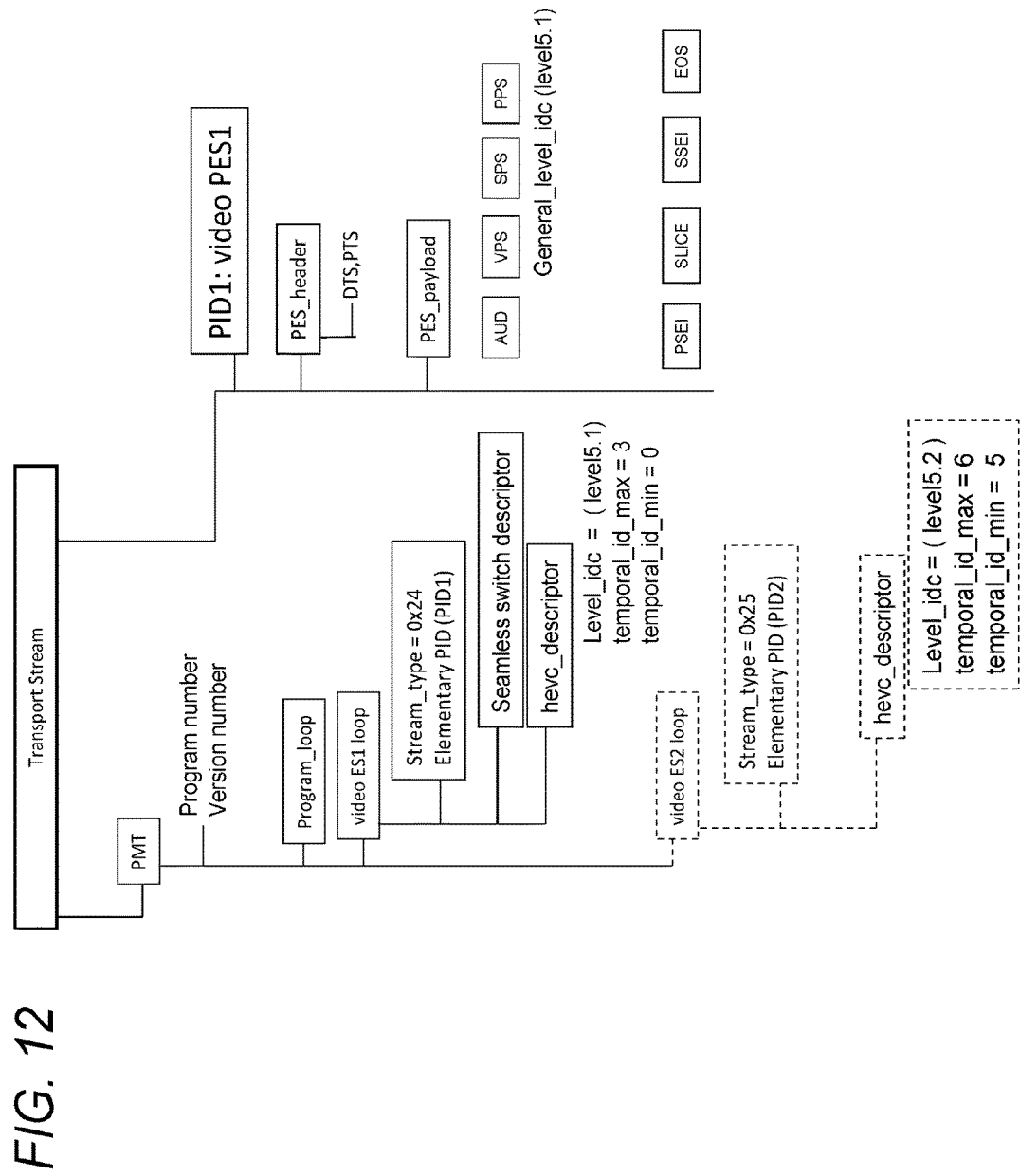
FIG. 12 is a diagram illustrating a structure example of a transport stream TS in a case of transmitting a video stream in a 60P service (including only a base stream).

FIG. 12 illustrates a structure example of a transport stream TS in a case of transmitting a video stream (including only a base stream) of a 60P service. In this structure example, there is a PES packet "video PES1" of the base stream which is identified by PID1. Here, PID1 is a PID fixed to the base stream.

In encoded image data of each picture, there is a NAL unit such as VPS, SPS, PPS, SLICE, SEI or the like. As described above, in the header of the NAL unit, hierarchy identification information ("nuh_temporal_id_plus1" which means temporal_id) of the picture is provided. In an SPS, "general_level_idc" which is a level specification value of a bit stream is inserted.

Further, in a transport stream TS, a PMT (Program Map Table) is included as a PSI (Program Specific Information). The PSI is information that indicates to which program each elementary stream included in the transport stream belongs. In the PMT, there is a program loop that describes information related to the entire program. Further, in the PMT, there is an elementary loop having information related to each elementary stream. In this structure example, there is a video elementary loop (video ES1 loop) which is applicable to the base stream.

In this video elementary loop (video ES1 loop), information such as a stream type, a PID (packet identifier) and the like corresponding to the base stream (video PES1) is provided and a descriptor that describes information related to the video stream is also provided. It is assumed that a value of "Stream_type" of the base stream is set as "0x24," and the PID information indicates PID1 that is applied to the PES packet "video PES1" of the base stream as described above.

Further, as a descriptor provided to the video elementary loop (video ES1 loop), the above described HEVC descriptor or seamless switch descriptor (Seamless_switch descriptor) is inserted. Here, in a case of using a video decode control descriptor (Video_decode_control descriptor) in which a field of "frame_rate" is newly defined, an insertion of the seamless switch descriptor is not required.

In the illustrated example, "level_idc" is set as "level5.1" in the HEVC descriptor. Further, it is set as "temporal_id_min=0" and "temporal_id_max=3" so that it is defined that the hierarchy range of the base stream is hierarchies from 0 to 3.

Here, in the first manner, there is only video elementary loop (video ES1 loop) corresponding to the base stream under the PMT; however, in the second manner, there is also a video elementary loop (video ES2 loop), which is illustrated with the dotted lines, corresponding to the enhanced stream.

In this video elementary loop (video ES2 loop), corresponding to an enhanced stream (video PES2) which does not exist in actual, information such as a stream type, a PID (packet identifier) and the like is provided, and a descriptor that describes information related to the video stream is also provided. It is assumed that a value of "Stream_type" of the enhanced stream is set as "0x25," and the PID information indicates PID2 which is allocated to the PES packet "video PES2" of the enhanced stream.

Further, as a descriptor provided to the video elementary loop, the above described HEVC descriptor or seamless switch descriptor (Seamless_switch descriptor) is inserted. Here, in a case of using a video decode control descriptor (Video_decode_control descriptor) in which a field of "frame_rate" is newly defined, the insertion of the seamless switch descriptor is not required.

In the illustrated example, in the HEVC descriptor, "level_idc" is set as "level5.2." Further, it is set as "temporal_id_min=5" and "temporal_id_max=6," and it is indicated that the hierarchy range that the enhanced stream may take is hierarchies 5 and 6 and that the enhanced stream does not exist in actual.

Here, the PMT included in the transport stream TS in a case of transmitting a video stream (including only abase stream) of a 60P service is generally assumed to have the illustrated content, and, at the timing immediately before starting transmission of a video stream of a following service, it is updated to a new PMT having contents corresponding to the video stream.

Figure 13:
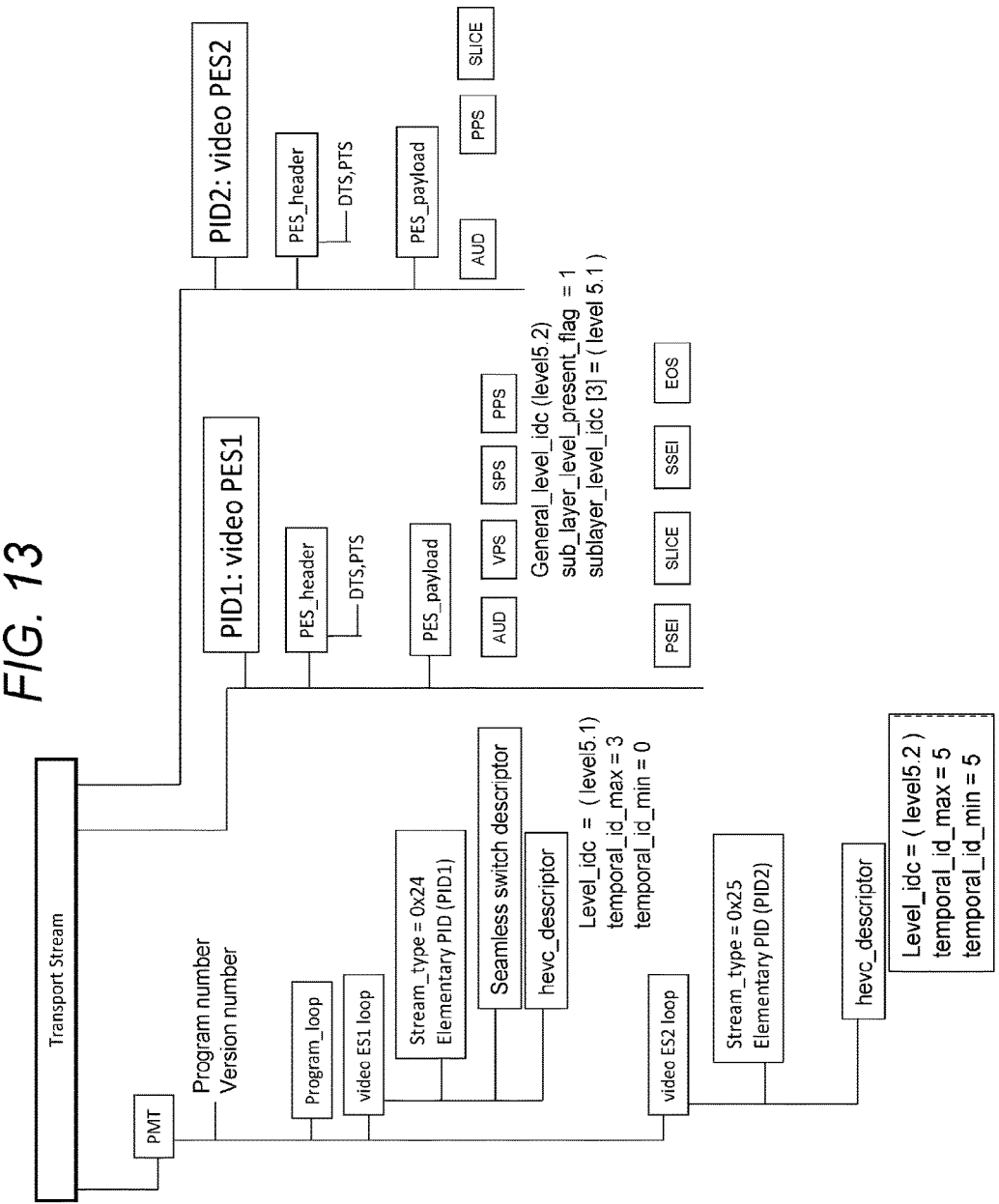
FIG. 13 is a diagram illustrating a structure example of a transport stream TS in a case of transmitting a video stream in a 120P service (including a base stream and an enhanced stream).

FIG. 13 illustrates a structure example of a transport stream TS in a case of transmitting a video stream (including a base stream and an enhanced stream) of a 120P service. In this structure example, there are a PES packet "video PEST" of the base stream which is identified with PID1 and a PES packet "video PES2" of the enhanced stream which is identified with PID2. Here, "stream_id" represents the same service (broadcast channel), PID1 is a fixed PID of the base stream, and PID2 is a fixed PID of the enhanced stream.

In the encoded image data of each picture of the base stream, there is a NAL unit such as VPS, SPS, PPS, SLICE, SEI or the like. In the header of the NAL unit, hierarchy identification information ("nuh_temporal_id_plus1" that means temporal_id) of the picture is provided. In the SPS, "general_level_idc" which is a level specification value of a bit stream is inserted. Further, in the SPS, pictures belonging to each hierarchy indicated by "temporal_id" are collected as a sub layer (sub layer) and, when "sublayer_level_presented_flag" is set as "1," "sublayer_level_idc" which is a level specification value of a bit rate of each sub layer is inserted.

On the other hand, in the encoded image data of each picture of the enhanced stream, there is a NAL unit such as PPS, SLICE or the like. In the header of the NAL unit, hierarchy identification information ("nuh_temporal_id_plus1" that means temporal_id) of the picture is provided.

Further, in the transport stream TS, a PMT (Program Map Table) as PSI (Program Specific Information) is included. The PSI is information that describes to which program each elementary stream included in the transport stream belongs.

In the PMT, there is a program loop that describes information related to the entire program. Further, in the PMT, there is an elementary loop having information related to each elementary stream. In this structure example, there are two video elementary loops (video ES1 loop and video ES2 loop).

In each video elementary loop, corresponding to video streams (video PES1 and video PES2), information such as stream types, packet identifiers (PIDs) and the like is provided and descriptors that describe information related to the video streams are also provided. The detail description of the video elementary loop (video ES1 loop) is omitted, but it has the same structure with the TS structure of FIG. 12.

In the video elementary loop (video ES2 loop), corresponding to the enhanced stream (video PES2), information such as a stream type, a PID (packet identifier) and the like is provided, and a descriptor that describes information related to the video stream is also provided. It is assumed that the value of "Stream_type" of the enhanced stream is set as "0x25" and the PID information indicates PID2 that is allocated to a PES packet "video PES2" of the enhanced stream.

Further, as a descriptor provided in the video elementary loop, the above described HEVC descriptor or seamless switch descriptor (Seamless_switch descriptor) is inserted. Here, when a video decode control descriptor (Video_decode_control descriptor) in which a field of "frame_rate" is newly defined is used, insertion of the seamless switch descriptor is not required. In the illustrated example, in the HEVC descriptor, "level_idc" is set as "level5.2." Further, it is indicated that it is set as "temporal_id_min=5" and "temporal_id_max=5," and that the pictures included in the enhanced stream is in hierarchy 5.

Here, the PMT included in the transport stream TS in a case of transmitting a video stream (including only a base stream) of a 120P service is generally assumed to have the illustrated contents and, at the timing immediately before starting transmission of a video stream of a following service, it is updated to a new PMT having the content corresponding to the video stream.

An operation of the transmission device 100 illustrated in FIG. 5 will be briefly explained. To the encoder 102A, uncompressed moving image data VDA having a frame frequency of 60 Hz is input. In the encoder 102A, to this moving image data VDA, for example, encoding such as H.264/AVC, H.265/HEVC and the like is performed. In this case, in the encoder 102A, image data of each picture that constitutes the moving image data VDA is classified into a plurality of hierarchies, the image data of the pictures classified into each hierarchy is encoded, and a video stream related to a 60P service having encoded image data of the pictures in each hierarchy is generated.

In this video stream, only a base stream is included. In other words, the encoder 102A generates a base stream having encoded image data of the pictures in all hierarchies obtained by hierarchical encoding. Here, hierarchical encoding is performed so that the hierarchy range of the pictures included in the base stream becomes within a previously allocated range. The video stream (base stream) which is generated in the encoder 102A and includes encoded data of the pictures in each hierarchy is supplied to the compressed data buffer (cpb) 103A and temporarily stored.

Further, to the encoder 102B, uncompressed moving image data VDB having a frame frequency of 120 Hz is input. In the encoder 102B, for example, encoding such as H.264/AVC, H.265/HEVC or the like is performed. In this case, in the encoder 102B, image data of each picture forming the moving image data VDB is classified into a plurality of hierarchies, image data of the pictures classified into each hierarchy is encoded, and a video stream related to a 120P service having the encoded image data of pictures in each hierarchy is generated.

In this video stream, abase stream and an enhanced stream are included. In other words, in the encoder 102B, the plurality of hierarchies are divided into two and abase stream having encoded image data of pictures in lower hierarchies and an enhanced stream having encoded image data of pictures in higher hierarchies are generated. Here, hierarchical encoding is performed so that the hierarchy range of the pictures included in the base stream and the enhanced stream becomes within the previously allocated ranges, and the number of hierarchies of the pictures to be included in the enhanced stream becomes one. The video stream (a base stream and an enhanced stream) which is generated in the encoder 102B and includes encoded data of pictures of each hierarchy is supplied to the compressed data buffer (cpb) 103B and temporarily stored.

In the multiplexer 104, when performing a 60P service, a video stream stored in the compressed data buffer 103A is read, packetized into a packetized elementary stream (PES), packetized into a transport packet and multiplexed to obtain a transport stream TS as a multiplexed stream. This transport stream TS includes only a base stream. In the multiplexer 104, a fixed PID (=PID_1) is applied to the base stream.

Further, in the multiplexer 104, when performing a 120P service, a video stream stored in the compressed data buffer 103B is read, packetized into a packetized elementary stream (PES), packetized into a transport packet, and multiplexed to obtain a transport stream TS as a multiplexed stream. This transport stream TS includes a base stream and an enhanced stream. In the multiplexer 104, a fixed PID (=PID_1) is applied to the base stream and a fixed PID (=PID_2) is applied to the enhanced stream.

Further, in the multiplexer 104, during a video stream transmission period of each service, PID information is inserted under a program map table (PMT). Here, according to the first PID information insertion manner, during a video stream transmission period of one service, PID information of each stream that constitutes the video stream is constantly inserted and, at the timing immediately before starting a video stream transmission period of a following service, PID information of each stream that constitutes the video stream is inserted. Further, according to the second PID information insertion manner, during the video stream transmission period of each service, PID information of both of a base stream and an enhanced stream are inserted.

Further, in the multiplexer 104, during a video stream transmission period of each service, hierarchy range information is inserted under the program map table (PMT). In this case, during a video stream transmission period of one service, hierarchy range information of pictures of each stream that constitutes the video stream is constantly inserted and, at the timing immediately before starting a video stream transmission period of a following service, hierarchy range information of the pictures of each stream that constitutes the video stream is inserted.

Here, in the multiplexer 104, during a transmission period of a video stream formed with a base stream, only hierarchy range information of a base stream is inserted according to the first manner, and in addition to the hierarchy range information of the base stream, information of the hierarchy range that the enhanced stream may take is also inserted according to the second manner. The number of the hierarchies of the pictures to be included in the enhanced stream is assumed to be one, but the information of the hierarchy range that the enhanced stream may take is assumed to include a plurality of hierarchies for example.

Further, in the multiplexer 140, during the video stream transmission period of each service, at least at the timing immediately before starting the video stream transmission period of a following service, switching information is inserted under program map table (PMT). In the insertion of this switching information, a newly defined seamless switch descriptor (Seamless_switch descriptor) or a conventional video decode control descriptor (Video_decode_control descriptor) is used.

In the transmission unit 105, the transport stream TS obtained in the multiplexer 104 is transmitted to the reception device 200 via a broadcasting wave or a packet in a network. In this case, for example, the transport stream TS of a 60P service is transmitted and a transport stream TS of a 120P service is subsequently transmitted. Alternatively, a transport stream TS of a 120P service is transmitted and a transport stream TS of a 60P service is subsequently transmitted.

Here, it has been described that the encoder 102A generates a video stream (a base stream) of a 60P service, the encoder 102B generates a video stream (a base stream and an enhanced stream) of a 120P service, and the multiplexer 104 switches them. However, the same effect may be given to the encoder 102B. In this case, the encoder 102B has a function to input uncompressed moving image data VDB having a frame frequency of 120 Hz and to output as switching an output of a video stream (a base stream) of a 60P service and an output of a video stream (a base stream and an enhanced stream) of a 120P service.

[Structure of Reception Device]

Figure 14:
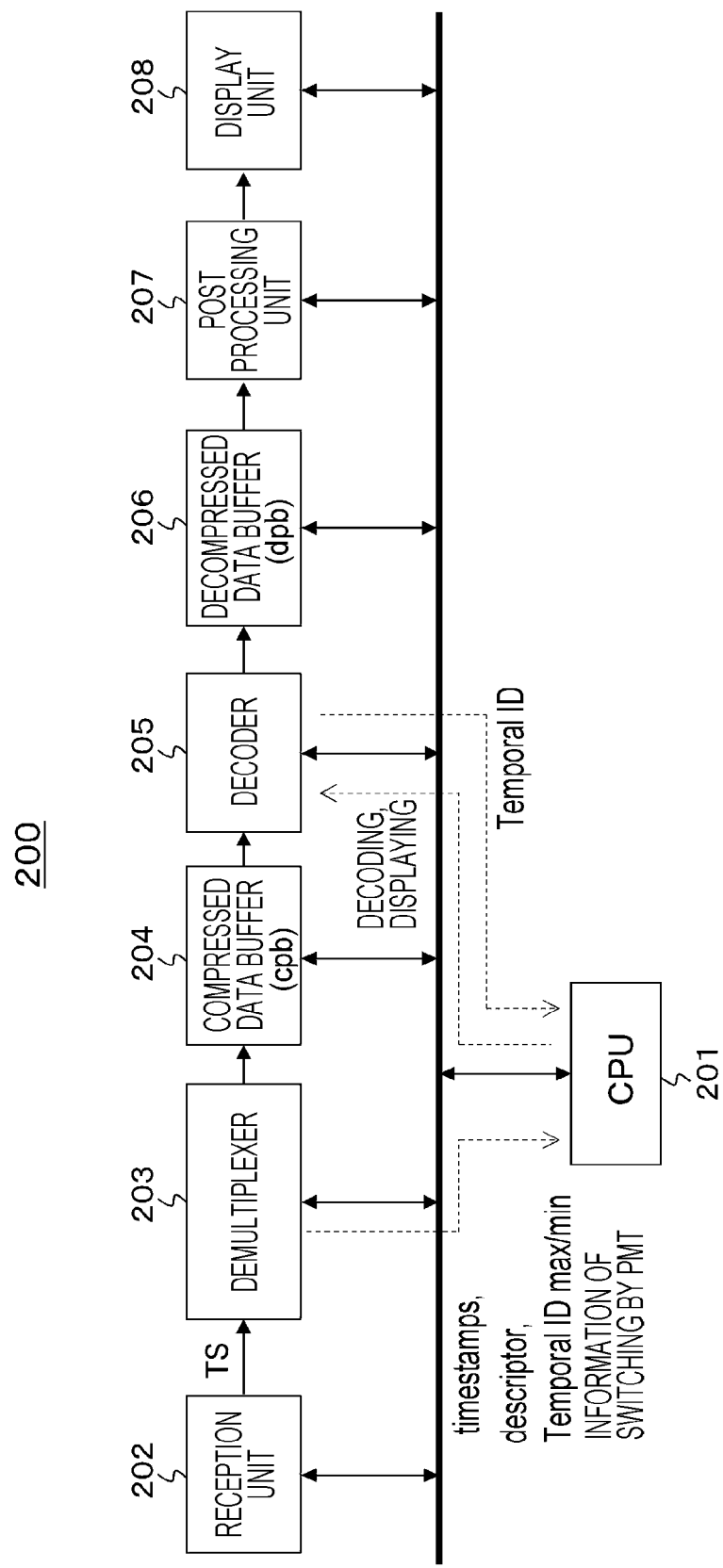
FIG. 14 is a block diagram illustrating a structure example of a reception device.

FIG. 14 illustrates a structure example of the reception device 200. The reception device 200 includes a CPU (Central Processing Unit) 201, a reception unit 202, a demultiplexer 203, and a compressed data buffer (cpb) 204. Further, the reception device 200 includes a decoder 205, a decompressed data buffer (dpb) 206, a post processing unit 207, and a display unit 208. The CPU 201 composes a control unit and controls operation of each unit in the reception device 200.

The reception unit 202 receives, from the transmission device 100, a transport stream TS transmitted via a broadcasting wave or a packet in a network. The demultiplexer 203 extracts a stream that constitutes the video stream from the transport stream TS by filtering with a PID filter and transmits the data to the compressed data buffer (cpb) 204.

In this case, a fixed PID is respectively applied to the base stream and the enhanced stream. Thus, for example, even when performing switching from a 60p service to a 120p service or switching in an opposite direction, it is not need to change the setting of the filter to extract each stream, and thus the occurrence of a display mute can be prevented and a seamless display is realized.

Figure 15:
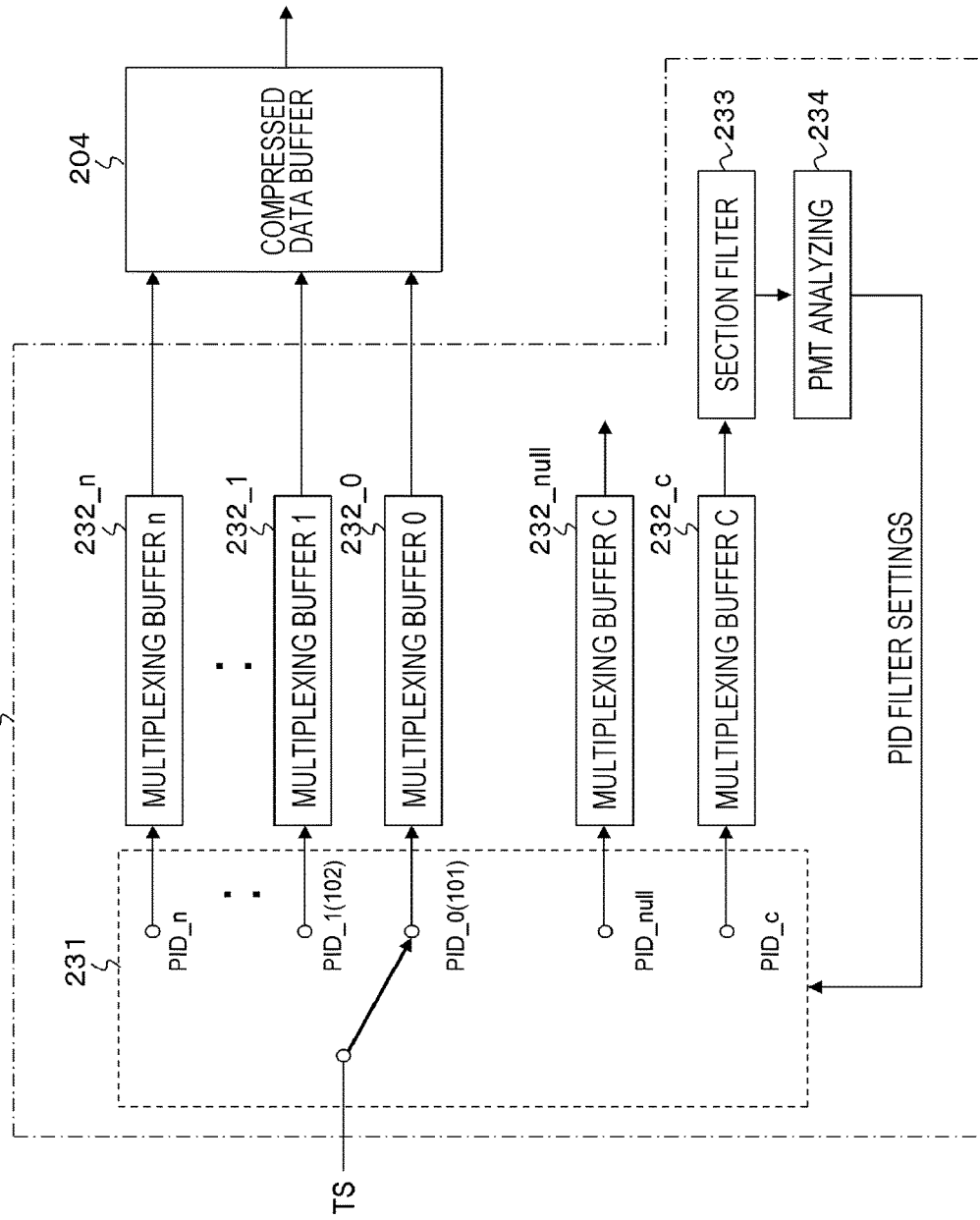
FIG. 15 is a diagram illustrating a structure example of a demultiplexer.

FIG. 15 illustrates a structure example of the demultiplexer 203. The demultiplexer 203 includes a PID filter 231, multiplexing buffers 232_0 to 232_n, 232_null, and 232_c, a section filter 233, and a PMT analyzing unit 234.

Based on the PID, the PID filter 231 lets through the section data and a null packet included in the transport stream TS. In the illustrated example, a PID value of the section data is set as PID_c and a PID of the null packet is set as PID_null. The null packet may be transferred so as to be inserted in the PID stream of the video without having own PID value. Thus, the multiplexing buffer of a receiver can detect the null packet and use this detection to determine that a switching may occur. Further, the PID filter 231 lets through a TS packet corresponding to a program number according to a broadcasting service channel, which is included in the transport stream TS, based on the PID value to be set. In the illustrated example, the PID values of the TS packets which can be set are set as PID_0 to PID_n.

The multiplexing buffers 232_0 to 232_n, 232_null, and 232_c temporarily store the TS packets, section data, null packet which have passed through the PID filter 231. In other words, in the demultiplexer 203, the multiplexing buffers are managed based on the PID values. The section filter 233 extracts a program map table (PMT) from the section data stored in the multiplexing buffer 232_c based on the PID value.

The PMT analyzing unit 234 analyzes the PMT extracted by the section filter 233 and, based on the analysis result, sets the PID filter 231 a PID value of TS packets to be passed through. For example, when the transport stream TS is a 60P service for example, "101" which is a fixed PID value applied the base stream is set as PID_0. Further, when the transport stream TS is a 120P service for example, "101" which is a fixed PID value applied to the base stream is set as PID_0, and "102" which is a fixed PID value applied to the enhanced stream is set as PID_1.

Depending on the decode performance of the decoder 205, the demultiplexer 203 transfers TS packets stored in the multiplexing buffers 232_0 to 232_n based on the PID values to the compressed data buffer 204. For example, when the decoder 205 is a 60p decoder, the demultiplexer 203 transfers the TS packets of the base stream stored in the multiplexing buffer 232_0 to the compressed data buffer 204. Further, for example, when the decoder 205 is a 120p decoder, the demultiplexer 203 transfers a TS packet of a base stream stored in the multiplexing buffer 232_0 and a TS packet of an enhanced stream stored in the multiplexing buffer 232_1 to the compressed data buffer 204.

Note that it has been described that, when the transport stream TS is a 120P service for example, the PID filter 231 let thought a TS packet of PID_0, PID_1; however, when the decoder 205 is a 60p decoder, a method that the PID filter 231 let though only TS packets of PID_0 may be used.

Referring back to FIG. 14, the compressed data buffer (cpb) 204 temporarily stores TS packets transferred from the demultiplexer 203, that is encoded image data of each picture. The decoder 205 reads and decodes encoded image data of each picture stored in the compressed data buffer 204 respectively at a decode timing given by a DTS (Decoding Time stamp) of the picture and transmits to the decompressed data buffer (dpb) 206.

The decompressed data buffer (dpb) 206 temporarily stores image data of each picture decoded in the decoder 205. The post processing unit 207 processes the frame rate of image data of each picture which is sequentially read at display timings given by the PTS (Presentation Time stamp) from the decompressed data buffer (dpb) 206 to adjust the display capability.

For example, in a case that the frame rate of the image data of each picture after decoding is 60 fps and the display capability is 120 fps, the post processing unit 207 performs an interpolation process on the image data of each picture after decoding so as to have twice as a resolution in a temporal direction and transmits the data as image data of 120 fps to the display unit 208.

The display unit 208 is composed of, for example, an LCD (Liquid Crystal Display), an Organic EL (Organic Electro-Luminescence) panel or the like. Here, the display unit 208 may be an external device to be connected to the reception device 200.

An operation of the reception device 200 illustrated in FIG. 14 will be briefly described. In the reception unit 202, a transport stream TS transmitted from the transmission device 100 via a broadcasting wave or a packet in a network is received. This transport stream TS is transmitted to the demultiplexer 203. In the demultiplexer 203, based on PID information included in a PMT, a TS packet corresponding to the service is extracted from the transport stream TS. This TS packet is transmitted to the compressed data buffer (cpb) 204 and temporarily stored.

For example, when the transport stream TS is a 60p service, a TS packet of a base stream is extracted and transferred to the compressed data buffer 204. Further, for example, with the transport stream TS of a 120p service, when the decoder 205 is a 60p decoder, a TS packet of a base stream is extracted and transferred to the compressed data buffer 204 and, when the decoder 205 is a 120p decoder, TS packet of both of the base stream and the enhanced stream are extracted and transferred to the compressed data buffer 204.

In the decoder 205, encoded image data of each picture stored in the compressed data buffer 204 is respectively decoded at decode timings of the pictures, transmitted to the decompressed data buffer (dpb) 206, and temporarily stored. Then, the image data of each picture which is sequentially read from the decompressed data buffer (dpb) 206 at display timings is transmitted to the post processing unit 207. In the post processing unit 207, interpolation or subsampling is performed on the image data of each picture to adjust those frame rates to the display capability. The image data of each picture processed in the post processing unit 207 is supplied to the display unit 208 and a moving image is displayed.

Figure 16:
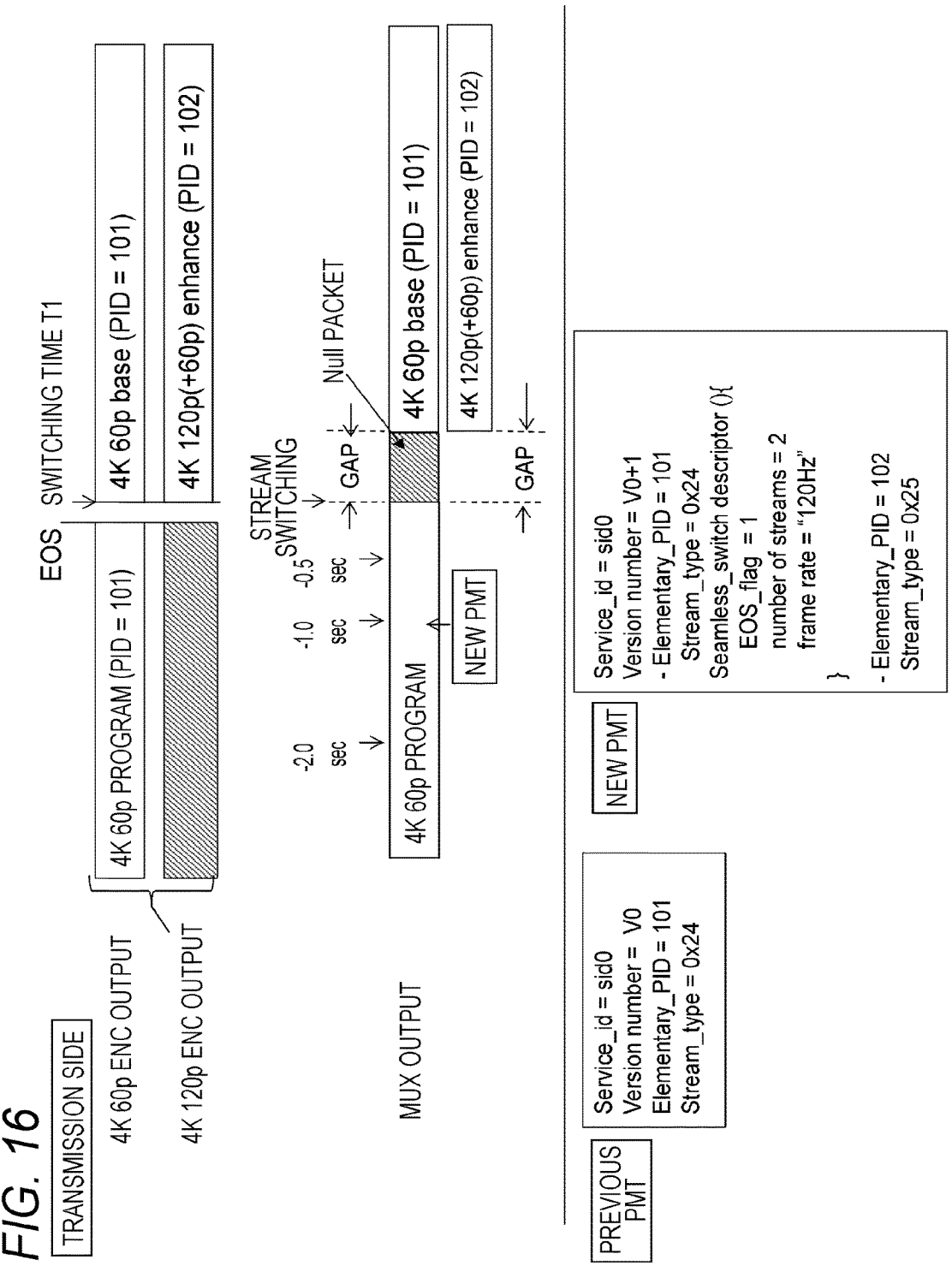
FIG. 16 is a diagram illustrating an operation example in a transmission side (the transmission device).

Next, an operation of switching from a 4K 60p program to a 4K 120p program in the transmission and reception system 10 illustrated in FIG. 1 will be explained. FIG. 16 illustrates an operation example of a sender, that is, the transmission device 100. During a 60p service transmission period, the encoder 102A generates a video stream of a 60p service. In this video stream, only a base stream, to which for example "101" is applied as a PID value is included.

Then, during the transmission period of a 60p service, in the multiplexer 104, this base stream is packetized as a packetized elementary stream (PES), then generated as a transport packet, and multiplexed to obtain a transport stream TS as a multiplexed stream, which serves as a transmission stream of a 4K 60p program.

During this 60p service transmission period, a PMT, which is illustrated as "previous PMT" is constantly inserted to the container layer and transmitted. This PMT includes information of "Service_id" and "Version number," and information of "Elementary_PID" and "Stream_type" corresponding to the base stream.

Further, during this 60p service transmission period, at timing immediately before starting a 120p service transmission period, which is for example a timing one second before the end of the 60p service transmission period, a PMT, which is illustrated as "new PMT" is inserted to the container layer and transmitted. Similarly to "previous PMT," this PMT includes information of "Service_id" and "Version number." "Version number" is changed from "V0" to "V0+ 1" to indicate the change to "new PMT."

Further, this PMT includes information of "Elementary_PID" and "Stream_type" corresponding to the base stream and also information of "Elementary_PID" and "Stream_type" corresponding to the enhanced stream. Further, in this PMT, seamless switch descriptor (Seamless_switch descriptor) in which switching information is written is included.

Here, it is set as "EOS_flag=1" and it is indicated that "end_of_seq" is encoded. Further, it is set as "number_of_streams=2" and it is indicated that the number of service streams after switching is two. Further, it is set as "frame_rate=1100 (120 Hz)" and it is indicated that the frame frequency of the service stream after switching is 120 Hz.

When the transmission period of the 60p service ends, it is switched to a transmission period of a 120p service. During the transmission period of the 120p service, the encoder 102B generates a video stream of a 120p service. In this video stream, a base stream to which for example "101" is applied as a PID value and an enhanced stream to which for example "102" is applied as a PID value are included.

Then, during this 120p service transmission period, in the multiplexer 104, the base stream and the enhanced stream are generated as PES packets, then generated as transport packets and multiplexed to obtain a transport stream TS as multiplexed stream, which serve as a transmission stream of a 4K 120p program. Here, between the transmission stream of the 4K 60p program and the transmission stream of the 4K 120p program, there is a gap period during which a null packet is transmitted.

Figure 17:
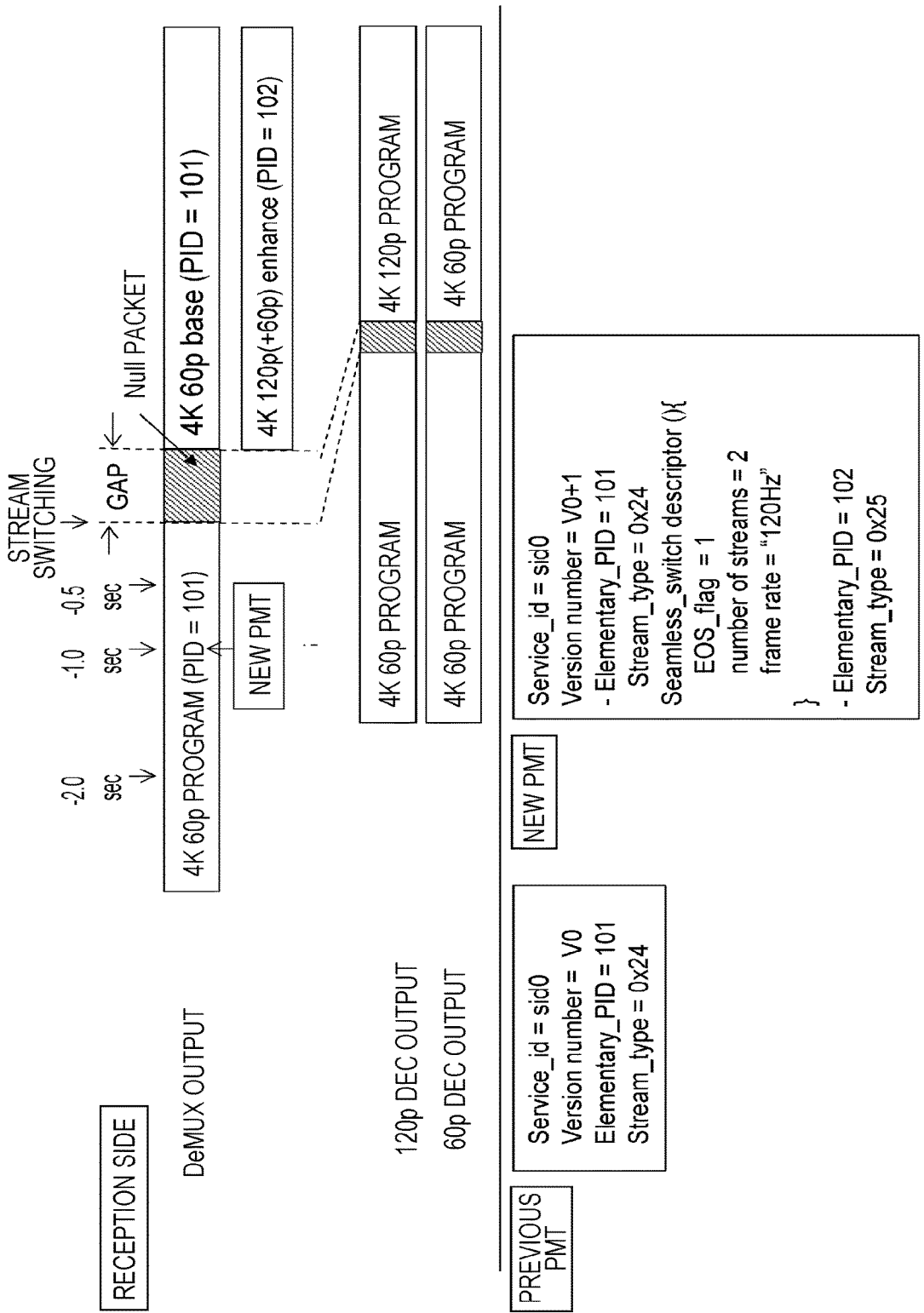
FIG. 17 is a diagram illustrating an operation example in a reception side (the reception device).

FIG. 17 illustrates an operation example of the reception side, that is, the reception device 200. During the transmission period of a 60p service, the demultiplexer 203 outputs a video stream of a 4K 60 program. Then, the decoder 205 outputs image data of a 4K 60 program in both cases of a 60p decoder and a 120p decoder.

During this transmission period of the 60p service, from the container layer, a PMT illustrated as "previous PMT" is constantly obtained and, at the timing immediately before starting the transmission period of the 120p service, "new PMT" is obtained. When the PID value of the enhanced stream included in the "new PMT" is set to the PID filter, the demultiplexer 203 becomes in a state to be able to output a video stream of a 4K 120 program.

When the 60p service transmission period ends, it is switched to a 120p service transmission period. In this case, the output of the demultiplexer 203 is switched from a 4K 60p program video stream (only a base stream) to a 4K 120p program video stream (a base stream and an enhanced stream) after a gap period which a null packet is included. Then, from the decoder 205, 4K 60 program image data is output in a case of a 60p decoder, and 4K 120 program image data is output in a case of a 120p decoder.

The operation of the demultiplexer 203 when switching from a 60p service transmission period to a 120p service transmission period will be further explained. During the 60p service transmission period, only a stream of PID_0 (101) (a base stream) passes through the PID filter 231 and is stored in the multiplexing buffer 232_0.

At the timing one second before the transmission period of the 60p service ends, the section filter 233 extracts "new PMT." This "new PMT" is analyzed in the PMT analyzing unit 234, and a PID value of a stream through which the PID filter 231 is passed, "Stream_type" and "Descriptor" are detected and a PID value is set to the PID filter 231. Thus, in the transmission period of the following 120p service, the PID filter 231 can let though a stream of PID_1 (102) (the enhanced stream) as well as a stream of PID_0(101) (the base stream).

After switching to the transmission period of the 120p service, the stream of PID_0 (101) (the base stream) passes through the PID filter 231 and is stored in the multiplexing buffer 232_0, and the stream of PID_0 (102) (the enhanced stream) also passes through the PID filter 231 and is stored in the multiplexing buffer 232_1. Here, when "EOS_flag" of the seamless switch descriptor in "new PMT" is "1," it is determined that switching will occur with number of the video formats and the service streams at timing of detecting EOS of the video stream.

Figure 18:
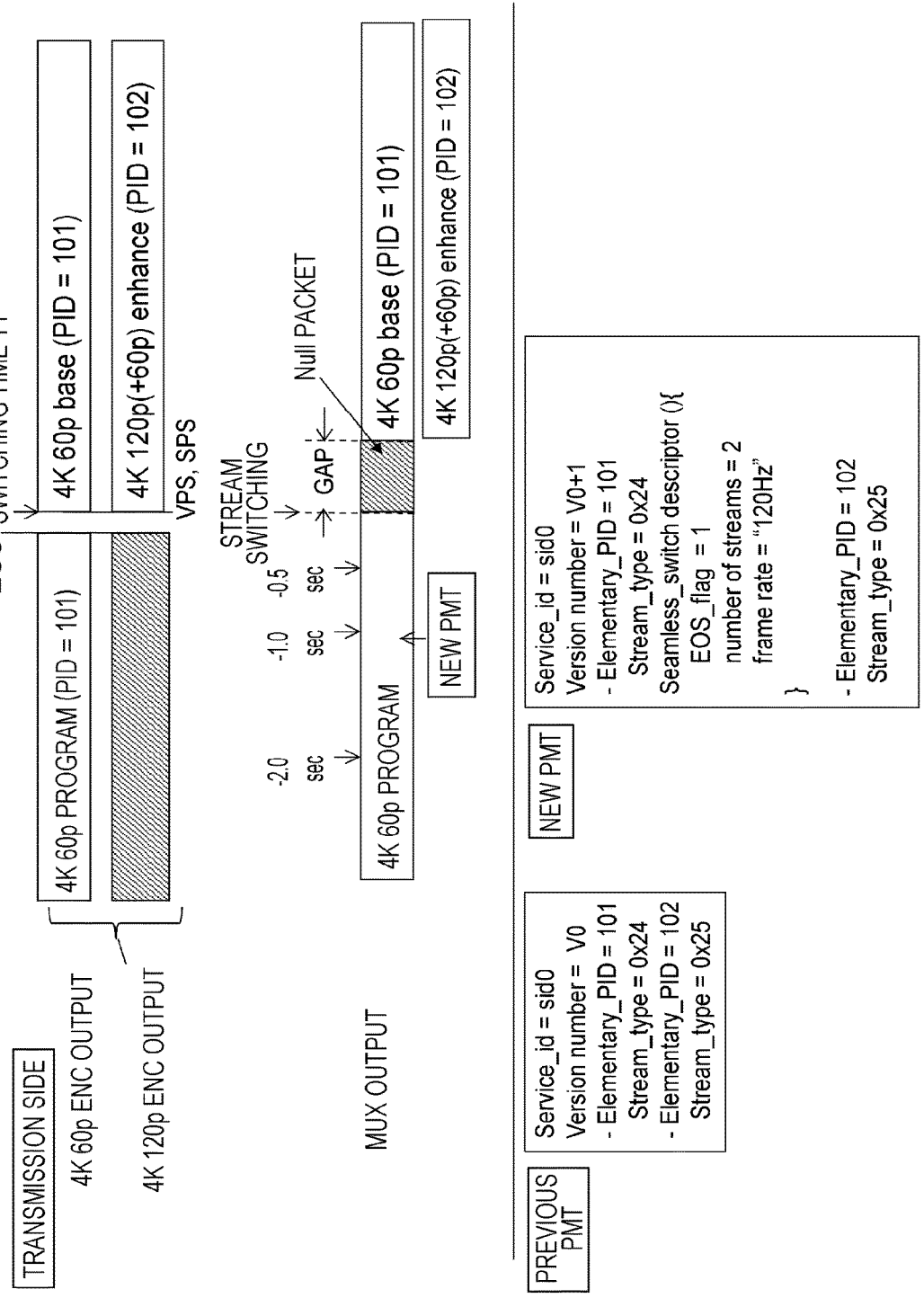
FIG. 18 is a diagram illustrating another operation example of the transmission side (the transmission device).
Figure 19:
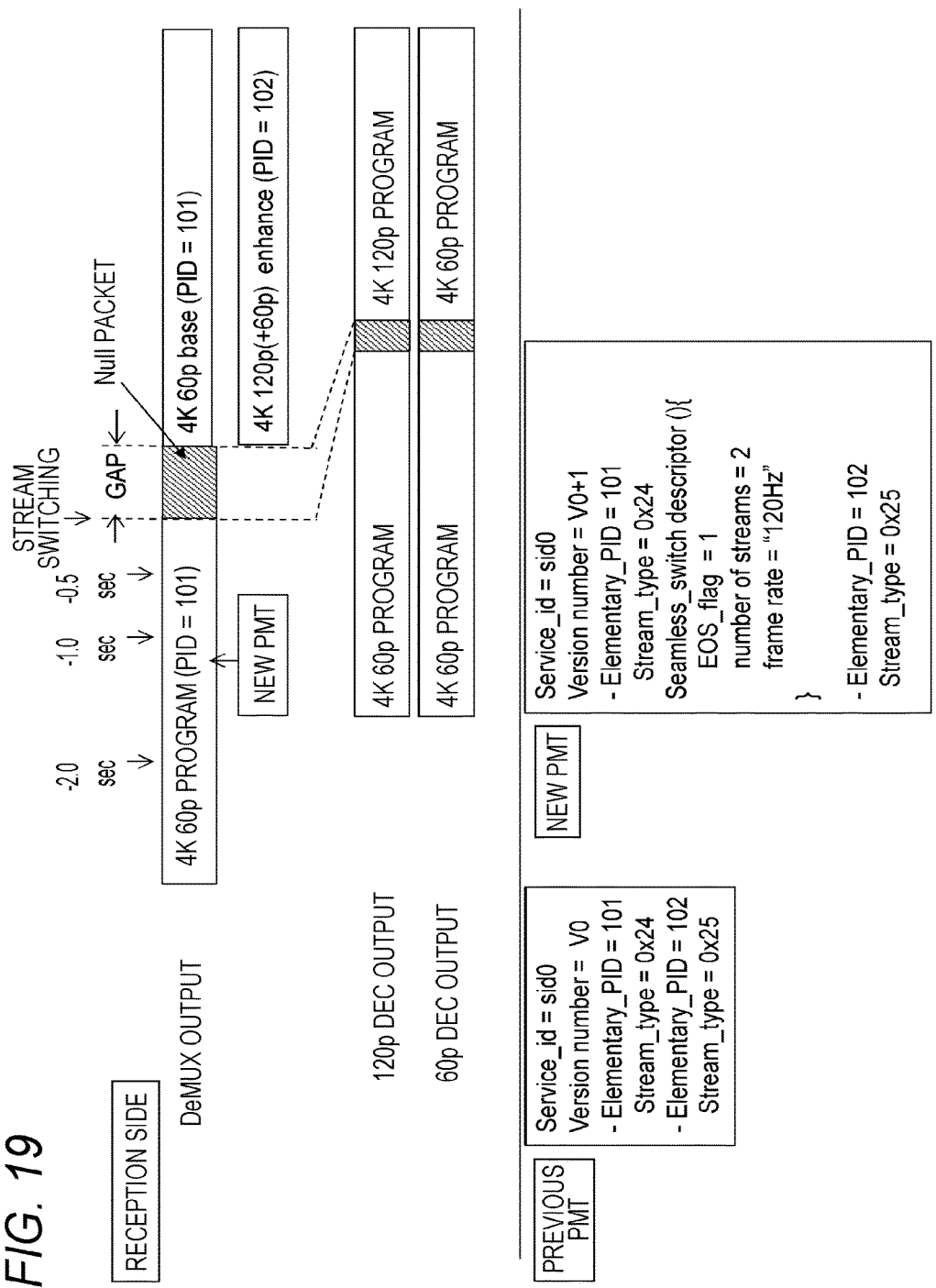
FIG. 19 is a diagram illustrating another operation example of the reception side (the reception device).

Here, the above operation examples illustrated in FIGS. 16 and 17 illustrate that the PID value of the enhanced stream is informed with "new PMT" inserted in the container layer at the timing immediately before starting the transmission period of the 120p service, that is, for example, at the timing one second before the transmission period of the 60p service ends (the first PID insertion manner). However, it is possible to reserve the PID value of the enhanced stream by including the PID value of the enhanced stream in "previous PMT," which is constantly inserted in the container layer during the transmission period of the 60p service (the second PID insertion manner). FIGS. 18 and 19 illustrate examples of the operations in the transmission side and the reception side.

Figure 20:
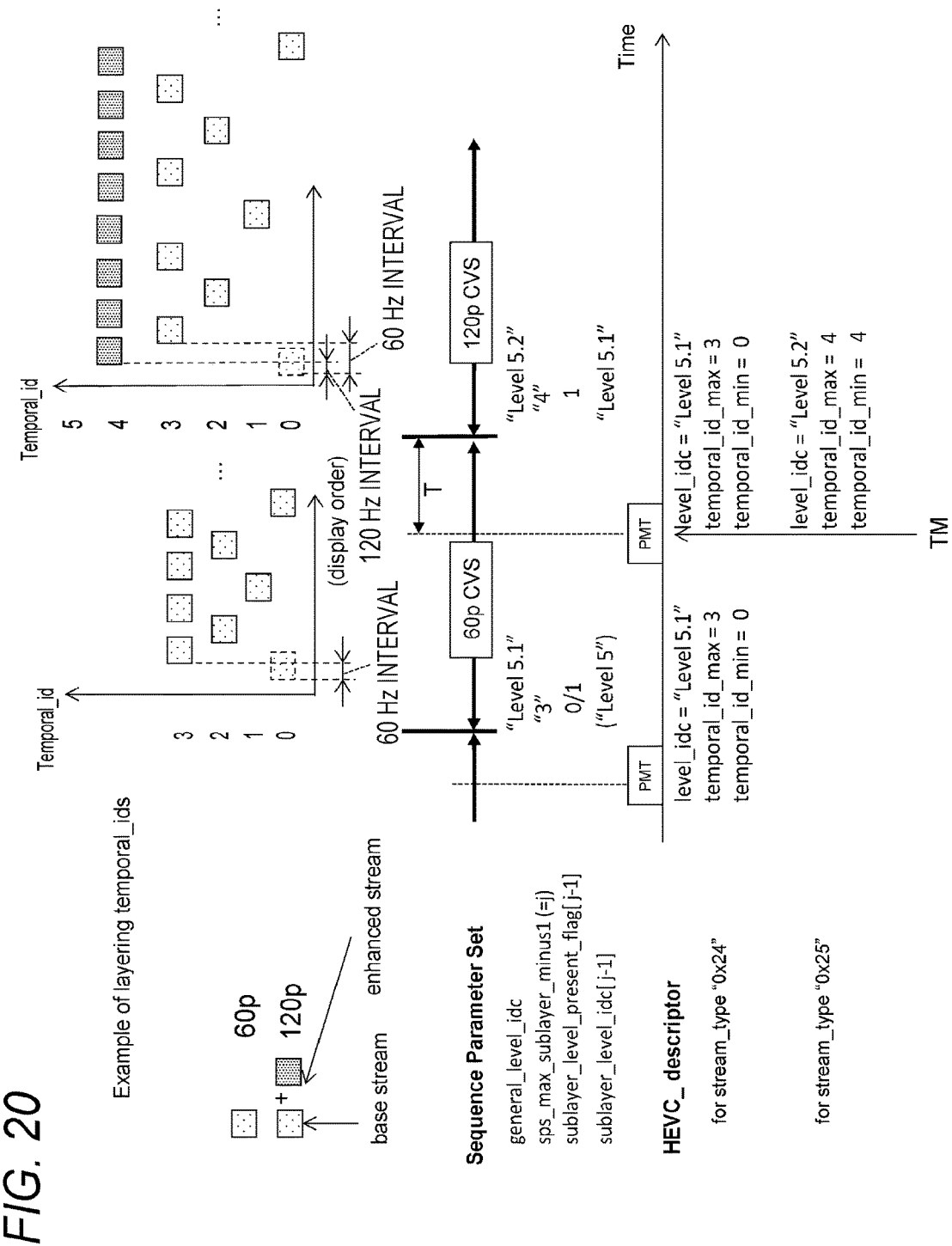
FIG. 20 is a diagram illustrating an example of a change of a hierarchical encoding structure according to an operation of service switching.

Next, a change of the hierarchical encoding structure corresponding to service switching operations in the transmission and reception system 10 illustrated in FIG. 1 will be explained. FIG. 20 illustrates an example of a change of the hierarchical encoding structure corresponding to a service switching operation. In this example, hierarchies 0 to 3 are allocated to the base streams, and hierarchies 4 and 5 are allocated to the enhanced streams.

In this example, in the video stream of the 60p service, encoded image data of each picture on which hierarchical encoding is performed is included. In this case, pictures exist in the hierarchies 0 to 3. In the video stream of 60p service, only a base stream is included. In this base stream, pictures in all hierarchies 0 to 3 are included. In this case, in the SPS of the base stream, "general_level_idc" is set as "level5.1" and it is set as "sps_max_sublayer_minus1=3."

Further, in this example, in the video stream of the 120p service, encoded image data of each picture on which hierarchical encoding is performed is included. In this case, pictures exist in hierarchies 0 to 4. In the video stream of the 120p service, a base stream and an enhanced stream are included. Pictures in the hierarchies 0 to 3 are included in the base stream, and pictures in the hierarchy 4 are included in the enhanced stream. In this case, in the SPS (Sequence Parameter Set) of the base stream, "general_level_idc" is set as "level5.2" and it is set as "sps_max_sublayer_minus1=4."

At the timing immediately before starting the transmission period of the 60p service, the PMT having information of the video stream of the 60p service is inserted in the container layer. In a HEVC descriptor included in the PMT, "level_idc" is set as "level5.1" and it is set as "temporal_id_min=0" and "temporal_id_max=3."

Similarly, during the 60p service transmission period, at the timing immediately before starting the 120p service, the PMT having information of the video stream of the 120p service is inserted in the container layer. In the HEVC descriptor of the base stream included in the PMT, "level_idc" is set as "level5.1" and further it is set as "temporal_id_min=0" and "temporal_id_max=3." Further, in the HEVC descriptor of the enhanced stream included in the PMT, "level_idc" is set as "level5.2" and further it is set as "temporal_id_min=4" and "temporal_id_max=4."

In this case, in a period T starting from an insertion of the PMT having information of the video stream of the 120p service until the end of the transmission period of the 60p service, the information of the video layer is the information of the video stream in the 60p service, while the information of the system layer is the information of the video stream in the 120p service. However, in this case, the ranges of the value of "temporal_id" of the video and the value of "temporal_id" of the HEVC descriptor are matched. This is because hierarchical encoding is performed on the video stream of each service so that the hierarchies of pictures respectively included in the base stream and the enhanced stream become within previously allocated ranges which are independent from each other.

Figure 21:
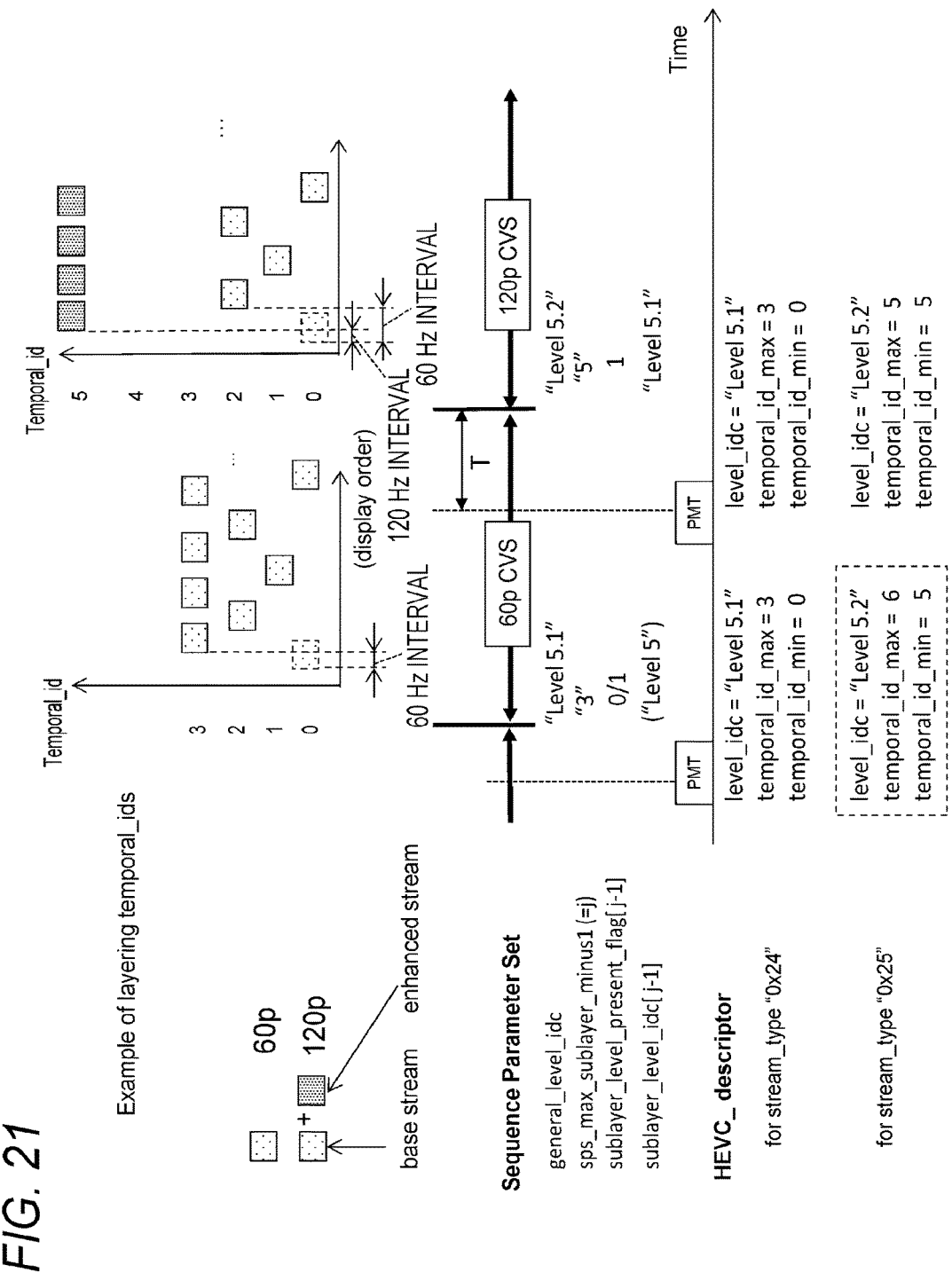
FIG. 21 is a diagram illustrating another example of the change of the hierarchical encoding structure according to the operation of service switching.

FIG. 21 illustrates another example of a change of a hierarchical encoding structure according to the operation of service switching. In this example, the hierarchies 0 to 3 are allocated to the base stream, and the hierarchies 5 and 6 are allocated to the enhanced stream.

In this example, in the video stream of a 60p service, encoded image data of each picture on which hierarchical encoding is performed is included. In this case, there are pictures in the hierarchies 0 to 3. In the video stream of the 60p service, only a base stream is included. In this base stream, pictures in all hierarchies 0 to 3 are included. In this case, in the SPS of the base stream, "general_level_idc" is set as "level5.1" and it is set as "sps_max_sublayer_minus1=3."

Further, in this example, in the video stream of a 120p service, encoded image data of each picture on which hierarchical encoding is performed is included. In this case, there are pictures in the hierarchies 0 to 2 and 5. In the video stream of the 120p service, a base stream and an enhanced stream are included. The base stream includes pictures in the hierarchies of 0 to 2 and the enhanced stream includes pictures in the hierarchy 5. In this case, in the SPS (Sequence Parameter Set) of the base stream, "general_level_idc" is set as "level5.2" and it is set as "sps_max_sublayer_minus1=5."

At the timing immediately before the transmission period of the 60p service is started, a PMT having information of the video stream of the 60p service is inserted in the container layer. In this PMT, there is information of the base stream and the enhanced stream. In the HEVC descriptor of the base stream, "level_idc" is set as "level5.1," and further, it is set as "temporal_id_min=0" and "temporal_id_max=3."

Further, in the HEVC descriptor of the enhanced stream, "level_idc" is set as "level5.2," and further, it is set as "temporal_id_min=5" and "temporal_id_max=6." With the settings, it is indicated that the hierarchy range that the enhanced stream may take is the hierarchies 5 and 6 and indicated that an enhanced stream does not exist in actual. Here, similarly to the illustration of FIG. 20, the information of the enhanced stream may not exist in the PMT.

Further, during the transmission period of the 60p service, at the timing immediately before starting the 120p service, a PMT having information of the video stream of the 120p service is inserted in the container layer. In the HEVC descriptor of the base stream included in the PMT, "level_idc" is set as "level5.1," and further, it is set as "temporal_id_min=0" and "temporal_id_max=3." Further, in the HEVC descriptor of the enhanced stream included in the PMT, "level_idc" is set as "level5.2," and further, it is set as "temporal_id_min=5" and "temporal_id_max=5."

In this case, in the period T starting from the insertion of the PMT having the information of the video stream of the 120p service until the end of the transmission period of the 60p service, the information of the video layer is information of the video stream of the 60p service while the information of the system layer is the information of the video stream of the 120p service. However, in this example, the range of the value of "temporal_id" of the video and the range of the value of "temporal_id" of the HEVC descriptor are matched. This is because hierarchical encoding is performed on the video stream of each service so that the hierarchies of the pictures respectively included in the base stream and the enhanced stream become within the previously allocated ranges which are independent from each other.

FIG. 22 illustrates an example of a change of the hierarchical encoding structure according to the operation of the service switching. This is an example that the hierarchies of the pictures respectively included in the base stream and the enhanced stream are not allocated in advance.

In this example, in the video stream of the 60p service, encoded image data of each picture on which hierarchical encoding is performed is included. In this case, there are pictures in the hierarchies 0 to 3. In the video stream of the 60p service, only a base stream is included. In this base stream, the pictures in all the hierarchies 0 to 3 are included. In this case, in the SPS of the base stream, "general_level_idc" is set as "level5.1" and it is set as "sps_max_sublayer_minus1=3."

Further, in this example, in the video stream of the 120p service, encoded image data of each picture on which hierarchical encoding is performed is included. In this case, pictures in the hierarchies 0 to 3 exist. In the video stream of the 120p service, a base stream and an enhanced stream are included. The base stream includes pictures in hierarchies 0 to 2 and the enhanced stream includes pictures in the hierarchy 3. In this case, in the SPS (Sequence Parameter Set) of the base stream, "general_level_idc" is set as "level5.2" and it is set as "sps_max_sublayer_minus1=3."

At the timing immediately before the transmission period of the 60p service is started, a PMT having information of the video stream of the 60p service is inserted in the container layer. In the HEVC descriptor included in the PMT, "level_idc" is set as "level5.1," and further, it is set as "temporal_id_min=0" and "temporal_id_max=3."

Similarly, during the transmission period of the 60p service, at the timing immediately before starting the 120p service, a PMT having information of the video stream of the 120p service is inserted in the container layer. In the HEVC descriptor of the base stream included in the PMT, "level_idc" is set as "level5.1," and further, it is set as "temporal_id_min=0", "temporal_id_max=2." Further, in the HEVC descriptor of the enhanced stream included in the PMT, "level_idc" is set as "level5.2" and it is set as "temporal_id_min=3" and "temporal_id_max=3."

In this case, in the period T starting from the insertion of the PMT having information of the video stream of the 120p service until the end of the transmission period of the 60p service, the information of the video layer is the information of the video stream of the 60p service while the information of the system layer is the information of the video stream of the 120p service. Then, in this example, the range of the value of "temporal_id" of the video and the value of "temporal_id" of the HEVC descriptor are not matched. This is because hierarchical encoding is not performed on the video stream of each service so that the hierarchies of the pictures respectively included in the base stream and the enhanced stream become within the previously allocated ranges which are independent from each other, and the layer of temporal_ID=3 may vary to exist in the base stream or exist in the enhanced stream.

As described above, in the transmission and reception system 10 illustrated in FIG. 1, in the transmission device 100, a fixed identifier (PID) is applied to the base stream and the enhanced stream. Thus, in the transmission side, even when switching from a 60p service to a 120p or from a 120p service to a 60p service, it is not required to change the settings of the filter to extract each stream in the demultiplexer 203. Thus an occurrence of a display mute can be prevented and a seamless display is realized.

Further, in the transmission and reception system 10 illustrated in FIG. 1, this is what hierarchical encoding of a video stream of each service is performed so that, in the video stream of each service, the hierarchies of the pictures respectively included in the base stream and the enhanced stream become within previously allocated ranges which are independent from each other. Thus, a mismatch between the range of the value of "temporal_id" of the video and the range of the value of "temporal_id" of the HEVC descriptor can be prevented.

<2. Modification>

Here, according to the above described embodiment, the transmission and reception system 10 composed of the transmission device 100 and the reception device 200 has been illustrated; however, the structure of the transmission and reception system to which the present technique can be applied is not limited to this structure. For example, the section of the reception device 200 may be, for example, a structure of a set top box and a monitor which are connected via a digital interface such as an HDMI (High-Definition Multimedia Interface). It is noted that the "HDMI" is a registered trademark.

Further, the above described embodiment has described an example that the container is the transport stream (MPEG-2 TS). However, the present technique can also be applied to a system of a structure in which data is delivered to a reception terminal using a network such as the Internet. For the delivery via the Internet, data is often delivered with a container of MP4 or in other formats. In other words, as the container, various format containers such as a transport stream (MPEG-2 TS) used as digital broadcast standards, and MP4 used for delivery via the Internet.

Further, the present technique may employ the following structures.

(1) A transmission device including:

an image encoding unit configured to encode image data of each picture that constitutes moving image data and generate a video stream; and a transmission unit configured to transmit a container in a predetermined format that continuously includes a first video stream and a second video stream which are generated by the image encoding unit, wherein the first video stream and the second video stream are composed of first to Mth streams out of first to Nth streams (M≤N), and the transmission unit applies a fixed identifier to the first to Nth streams respectively.

(2) The transmission device according to (1), wherein the transmission unit constantly inserts, during a transmission period of the first video stream, identifier information of each stream that constitutes the first video stream into a container layer and transmits, and inserts, at a timing immediately before a transmission period of the second video stream is started, an identifier information of each stream that constitutes the second video stream into the container layer and transmits.

(3) The transmission device according to (1), wherein the transmission unit inserts, during the transmission period of each video stream, the identifier information of the respective first to Nth streams into a container layer and transmits.

(4) The transmission device according to any of (1) to (3), wherein the transmission unit inserts, during the transmission period of each video stream, switching information into a container layer and transmits.

(5) The transmission device according to (4), wherein the switching information includes frame rate information and/or stream structure information of the encoded image data included in the second video stream.

(6) The transmission device according to any of (1) to (5), wherein the first video stream and the second video stream are composed of at least a base stream out of the base stream and an enhanced stream.

(7) The transmission device according to (6), wherein a video stream composed of the base stream includes encoded image data in a first frame rate, and a video stream composed of the base stream and the enhanced stream includes encoded image data in a second frame rate which is twice as fast as the first frame rate.

(8) The transmission device according to any of (1) to (7), wherein the image encoding unit classifies image data of each picture that constitutes the moving image data into a plurality of hierarchies, encodes the image data of the pictures in each classified hierarchy, divides the plurality of hierarchies into M number of hierarchy groups, and generates the first to Mth streams of each of the video stream which respectively has the encoded image data of the pictures of the divided each hierarchy group, and hierarchical encoding is performed so that the hierarchies of the pictures which are respectively included in the respective first to Mth streams become within previously allocated ranges which are independent from each other.

(9) The transmission device according to (8), wherein the transmission unit constantly inserts, during the transmission period of the first video stream, hierarchy range information of the picture of each stream that constitutes the first video stream into the container layer and transmits, and inserts, at timing immediately before a transmission period of the second video stream is started, hierarchy range information of the picture of each stream that constitutes the second video stream into the container layer and transmits.

(10) The transmission device according to (8) or (9), wherein the first video stream and the second video stream include at least a base stream out of the base stream and an enhanced stream, and the image encoding unit encodes so that the number of hierarchies of the pictures included in the enhanced stream becomes one.

(11) The transmission device according to (10), wherein during the transmission period of each of the video stream, when only the base stream is included in the video stream, the transmission unit inserts hierarchy range information of the picture of the base stream and hierarchy range information of the picture of the enhanced stream into the container layer and transmits.

(12) A transmission method including:

an image encoding step of encoding image data of each picture that constitutes moving image data and generating a video stream; and a transmission step of transmitting a container in a predetermined format which continuously includes a first video stream and a second video stream which are generated in the image encoding step, wherein the first video stream and the second video stream are composed of first to Mth streams out of first to Nth streams (M≤N), and in the transmission step, a fixed identifier is applied to the first to Nth streams respectively.

(13) A reception device, including:

a reception unit configured to receive a container in a predetermined format which continuously includes a first video stream and a second video stream which include encoded image data, wherein the first video stream and second video stream are composed of first to Mth streams out of first to Nth streams (M≤N), and a fixed identifier is applied to the first to Nth streams respectively, the reception device, further including:

a processing unit configured to process each stream included in the first video stream and the second video stream by filtering based on the respectively applied identifiers.

(14) The reception device according to (13), wherein in the first to Mth streams of each of the video stream, image data of each picture that constitutes the moving image data is classified into a plurality of hierarchies, the image data of the pictures in each of the classified hierarchies is encoded, the plurality of hierarchies are divided into M number of hierarchy groups, and the encoded image data of the pictures of each of the divided hierarchy groups is respectively included, and hierarchical encoding is performed so that the hierarchies of the pictures included in each of the first to Mth streams become within previously allocated ranges which are independent from each other.

(15) A reception method, including:

a reception step of receiving a container in a predetermined format which continuously includes a first video stream and a second video stream which include encoded image data, wherein the first video stream and the second video stream are composed of first to Mth streams out of first to Nth streams (M≤N), and a fixed identifier is applied to the first to Nth streams respectively, the reception method, further including:

a processing step of processing each stream included in the first video stream and the second video stream by filtering based on the respectively applied identifiers.

(16) A transmission device, including:

an image encoding unit configured to generate a video stream having encoded image data, and a transmission unit configured to transmit a container in a predetermine format which continuously includes a first video stream and a second video stream generated by the image encoding unit, wherein the first video stream and the second video stream are composed of first to Mth streams out of first to Nth streams (M≤N), the image encoding unit classifies image data of each picture that constitutes moving image data into a plurality of hierarchies, encodes the image data of the pictures in each classified hierarchy, divides the plurality of hierarchies into M number of hierarchy groups, and generates the first to Mth streams of each of the video streams respectively including encoded image data of the pictures of each of the divided hierarchy groups, and hierarchical encoding is performed so that the hierarchies of the pictures included in the respective first to Mth streams become within previously al located ranges which are independent from each other.

(17) The transmission device according to (16), wherein the transmission unit constantly inserts, during a transmission period of the first video stream, hierarchy range information of the pictures of each stream included in the first video stream into a container layer and transmits, and inserts, at a timing immediately before a transmission period of the second video stream is started, hierarchy range information of the pictures of each stream included in the second video stream into the container layer and transmits.

(18) The transmission device according to (16) or (17), wherein the first video stream and the second video stream include at least a base stream out of the base stream and an enhanced stream, and the number of the hierarchies of the pictures included in the enhanced stream is assumed to be one.

(19) The transmission device according to (18), wherein during the transmission period of each video stream, when only the base stream is included in the video stream, the transmission unit inserts hierarchy range information of the pictures of the base stream and hierarchy range information of the pictures of the enhanced stream into the container layer and transmits.

The major characteristics of the present technique is that, by applying a fixed identifier to a base stream and an enhanced stream, the reception side does not need to change the settings of the filter to extract each stream by the demultiplexer even when the services are switched, and this prevents an occurrence of a display mute and realizes a seamless display (see FIG. 16). Further, the major characteristics of the present technique is that hierarchical encoding is performed on the video stream of each service so that the hierarchies of pictures respectively included in the base stream and the enhanced stream become within the previously allocated ranges which are independent from each other and this prevents a mismatch between the values of "temporal_id" of the video and the HEVC descriptor (see FIG. 20).

REFERENCE SIGNS LIST

10 Transmission and reception system
100 Transmission device
101 CPU
102A, 102B Encoder
103A, 103B Compressed data buffer (cpb)
104 Multiplexer
105 Transmission unit
141 Section information generation unit
142 Null packet generation unit 143 Selector
144 PID allocation unit
145 TS multiplexing unit
200 Reception device
201 CPU
202 Reception unit
203 Demultiplexer
204 Compressed data buffer (cpb)
205 Decoder
206 Decompressed data buffer (dpb)
207 Post processing unit
208 Display unit
231 PID filter
232_0 to 232_n, 232_null, 232_c Multiplexing buffer
233 Section filter
234 PMT analyzing unit

The invention claimed is:

1. A transmission device comprising:
   circuitry configured to:
   perform hierarchical encoding on image data of each picture that constitutes moving image data and generate a base stream including encoded image data of a picture in a lower hierarchy and an enhanced stream including encoded image data of a picture in a higher hierarchy;
   set a hierarchy of a picture included in the enhanced stream as a fixed hierarchy that is a higher hierarchy than a highest hierarchy that any picture of the base stream is configured to have when a structure of the hierarchical encoding changes according to an operation of service switching, wherein the hierarchies of the pictures included in the base stream and the hierarchies of the pictures included in the enhanced stream are within previously allocated respective ranges that are independent from each other and do not overlap;
   insert a first table having information on the base stream into a container before a transmission period of the base stream, wherein the information on the base stream includes a bit rate level specification value of the base stream and a hierarchy range of the base stream, and wherein the bit rate level specification value of the base stream is set to a first value and the hierarchy range of the base stream is set to a first range;
   insert a second table having information on the base stream and information on the enhanced stream into the container during the transmission period of the base stream and before a transmission period of the enhanced stream, wherein the information on the enhanced stream includes a bit rate level specification value of the enhanced stream and a hierarchy range of the enhanced stream, wherein the bit rate level specification value of the enhanced stream is set to a second value and the hierarchy range of the enhanced stream is set to a second range, and wherein the bit rate level specification value of the base stream is set to the first value and the hierarchy range of the base stream is set to the first range,
   wherein in a time period starting from an insertion of the second table until an end of the transmission period of the base stream, information of a video layer is information of the base stream while information of a system layer is information of the enhanced stream; and
   transmit the container in a predetermined format that includes the base stream and the enhanced stream.

2. The transmission device according to claim 1, wherein the circuitry is further configured to:
   insert a level specification value of a bit rate of the base stream and the enhanced stream into the container.

3. The transmission device according to claim 1, wherein the circuitry is further configured to:
   insert hierarchy range information of the picture of the base stream and the enhanced stream to the container.

4. The transmission device according to claim 1, wherein the base stream includes encoded image data of 60 Hz and the base stream and the enhanced stream include encoded image data of 120 Hz.

5. The transmission device according to claim 1, wherein the number of hierarchies of the pictures included in the enhanced stream is one.

6. A transmission method, comprising:
   performing hierarchical encoding on image data of each picture that constitutes moving image data and generating a base stream including encoded image data of a picture in a lower hierarchy and an enhanced stream including encoded image data of a picture in a higher hierarchy,
   setting a hierarchy of a picture included in the enhanced stream as a fixed hierarchy that is a higher than a highest hierarchy that any picture of the base stream is configured to have when a structure of the hierarchical encoding changes according to an operation of service switching, wherein the hierarchies of the pictures included in the base stream and the hierarchies of the pictures included in the enhanced stream are within previously allocated respective ranges that are independent from each other and do not overlap;
   inserting a first table having information on the base stream into a container before a transmission period of the base stream, wherein the information on the base stream includes a bit rate level specification value of the base stream and a hierarchy range of the base stream, and wherein the bit rate level specification value of the base stream is set to a first value and the hierarchy range of the base stream is set to a first range;
   inserting a second table having information on the base stream and information on the enhanced stream into the container during the transmission period of the base stream and before a transmission period of the enhanced stream, wherein the information on the enhanced stream includes a bit rate level specification value of the enhanced stream and a hierarchy range of the enhanced stream, wherein the bit rate level specification value of the enhanced stream is set to a second value and the hierarchy range of the enhanced stream is set to a second range, and wherein the bit rate level specification value of the base stream is set to the first value and the hierarchy range of the base stream is set to the first range,
   wherein in a time period starting from an insertion of the second table until an end of the transmission period of the base stream, information of a video layer is information of the base stream while information of a system layer is information of the enhanced stream; and
   transmitting the container in a predetermined format that includes the base stream and the enhanced stream.

7. A reception device comprising:
   circuitry configured to:
   receive a container in a predetermined format including a base stream having encoded image data of a picture in a lower hierarchy and an enhanced stream having encoded image data of a picture in a higher hierarchy, which are generated by performing hierarchical encoding on image data of each picture that constitutes moving image data, wherein a hierarchy of a picture included in the enhanced stream is set as a fixed hierarchy that is a higher hierarchy than a highest hierarchy that any picture of the base stream is configured to have when a structure of the hierarchical encoding changes according to an operation of service switching, wherein the hierarchies of the pictures included in the base stream and the hierarchies of the pictures included in the enhanced stream are within previously allocated respective ranges that are independent from each other and do not overlap; and extract only encoded image data of the picture of each hierarchy included in the base stream according to the decode performance or extract both of encoded image data of the picture of each hierarchy included in the base stream and encoded image data of the picture of the fixed hierarchy included in the enhanced stream, and obtain image data of each picture that constitutes moving image data by performing a decode process on the encoded image data of each extracted picture, wherein a first table having information on the base stream is inserted into the container before a transmission period of the base stream, wherein the information on the base stream includes a bit rate level specification value of the base stream and a hierarchy range of the base stream, and wherein the bit rate level specification value of the base stream is set to a first value and the hierarchy range of the base stream is set to a first range, wherein a second table having information on the base stream and information on the enhanced stream is inserted into the container during the transmission period of the base stream and before a transmission period of the enhanced stream, wherein the information on the enhanced stream includes a bit rate level specification value of the enhanced stream and a hierarchy range of the enhanced stream, wherein the bit rate level specification value of the enhanced stream is set to a second value and the hierarchy range of the enhanced stream is set to a second range, and wherein the bit rate level specification value of the base stream is set to the first value and the hierarchy range of the base stream is set to the first range, and wherein in a time period starting from an insertion of the second table until an end of the transmission period of the base stream, information of a video layer is information of the base stream while information of a system layer is information of the enhanced stream.

8. A reception method comprising:

receiving a container in a predetermined format that includes a base stream having encoded image data of a picture in a lower hierarchy and an enhanced stream having encoded image data of a picture in a higher hierarchy, which are generated by performing hierarchical encoding on image data of each picture that constitutes moving image data, wherein a hierarchy of a picture included in the enhanced stream is set as a fixed hierarchy that is a higher hierarchy than a highest hierarchy that any picture of the base stream is configured to have when a structure of the hierarchical encoding changes according to an operation of service switching, wherein the hierarchies of the pictures included in the base stream and the hierarchies of the pictures included in the enhanced stream are within previously allocated respective ranges that are independent from each other and do not overlap; and extracting only encoded image data of a picture of each hierarchy included in the base stream or extracting both of encoded image data of the picture of each hierarchy included in the base stream and encoded image data of the picture of the fixed hierarchy included in the enhanced stream according to a decode performance, and obtaining image data of each picture that constitutes moving image data by performing a decode process on the encoded image data of each extracted picture, wherein a first table having information on the base stream is inserted into the container before a transmission period of the base stream, wherein the information on the base stream includes a bit rate level specification value of the base stream and a hierarchy range of the base stream, and wherein the bit rate level specification value of the base stream is set to a first value and the hierarchy range of the base stream is set to a first range, wherein a second table having information on the base stream and information on the enhanced stream is inserted into the container during the transmission period of the base stream and before a transmission period of the enhanced stream, wherein the information on the enhanced stream includes a bit rate level specification value of the enhanced stream and a hierarchy range of the enhanced stream, wherein the bit rate level specification value of the enhanced stream is set to a second value and the hierarchy range of the enhanced stream is set to a second range, and wherein the bit rate level specification value of the base stream is set to the first value and the hierarchy range of the base stream is set to the first range, and wherein in a time period starting from an insertion of the second table until an end of the transmission period of the base stream, information of a video layer is information of the base stream while information of a system layer is information of the enhanced stream.

9. The transmission device according to claim 1, wherein the first value of the bit rate level specification value is 5.1, wherein the second value of the bit rate level specification value is 5.2, wherein the first range of the hierarchy range is from 0 to 3, and wherein the second range of the hierarchy range is from 5 to 5.

* * * * *